United States Patent [19]

Kincheloe et al.

[11] 4,120,031

[45] Oct. 10, 1978

[54] UTILITY USAGE MONITORING SYSTEMS

[75] Inventors: Dan D. Kincheloe, Newport Beach; Elmo M. Gregory, Costa Mesa; Carl David Todd, Costa Mesa; Edson B. Gould, III, Newport Beach, all of Calif.

[73] Assignee: Energy Conservation Systems, Inc., Costa Mesa, Calif.

[21] Appl. No.: 810,675

[22] Filed: Jun. 27, 1977

Related U.S. Application Data

[63] Continuation-in-part of Ser. No. 706,679, Jul. 19, 1976.

[51] Int. Cl.² .................... G06K 1/00; G01R 19/16; G06F 15/20
[52] U.S. Cl. .................... 364/464; 364/483; 324/113; 235/432
[58] Field of Search ............... 364/464, 492, 483, 200; 324/110, 112, 113; 340/163, 310 A, 150, 151; 346/33 R, 34; 235/61.9 R

[56] References Cited

U.S. PATENT DOCUMENTS

| | | | |
|---|---|---|---|
| 3,046,534 | 7/1962 | Constant, Jr. | 324/113 |
| 3,416,075 | 12/1968 | Rutenberg | 324/157 |
| 3,502,980 | 3/1970 | Baggott | 324/103 |
| 3,590,220 | 6/1971 | Ishida et al. | 235/61.9 R |
| 3,634,663 | 1/1972 | Williams et al. | 235/151.3 |
| 3,747,068 | 7/1973 | Bruner et al. | 340/151 |
| 3,842,248 | 10/1974 | Yarnell et al. | 235/61.9 R X |
| 3,932,730 | 1/1976 | Ambrosio | 235/61.9 R |
| 3,937,937 | 2/1976 | McVey | 364/200 X |
| 3,946,220 | 3/1976 | Brobeck et al. | 364/200 X |
| 3,950,759 | 4/1976 | Ziegenfuss | 346/33 R |
| 3,998,093 | 12/1976 | Bertolasi | 73/112 |

Primary Examiner—Edward J. Wise
Attorney, Agent or Firm—Blakely, Sokoloff, Taylor & Zafman

[57] ABSTRACT

Utility usage monitoring systems for monitoring the consumption or use of a particular utility and displaying the accumulated use in terms of its cost. The rate of usage of the utility is converted to a pulse train with a repetition rate dependent upon the usage. In one embodiment, a calculator chip having an automatic constant capability and coupled to an electronic display is caused to successively execute a summing operation dependent upon the pulse train repetition rate and to provide a cumulative total for display. A keyboard is provided to enter the automatic constant, and to allow the change thereof to provide the proper utility cost or charge. Another embodiment utilizes a microprocessor coupled to a display for displaying the accumulated utility usage, with the microprocessor being programmed to repetitively update the display. Provisions may be made for entering such parameters as base charges and utility cost break points in accordance with the utility billing practice so as to provide a high degree of accuracy in the accumulated readout. Incorporation of reading and printing devices and a timekeeping capability allows alteration billing rates, billing by mail, time of day (peak hour) rate adjustment and automatic load control and shedding. Various embodiments are disclosed.

71 Claims, 12 Drawing Figures

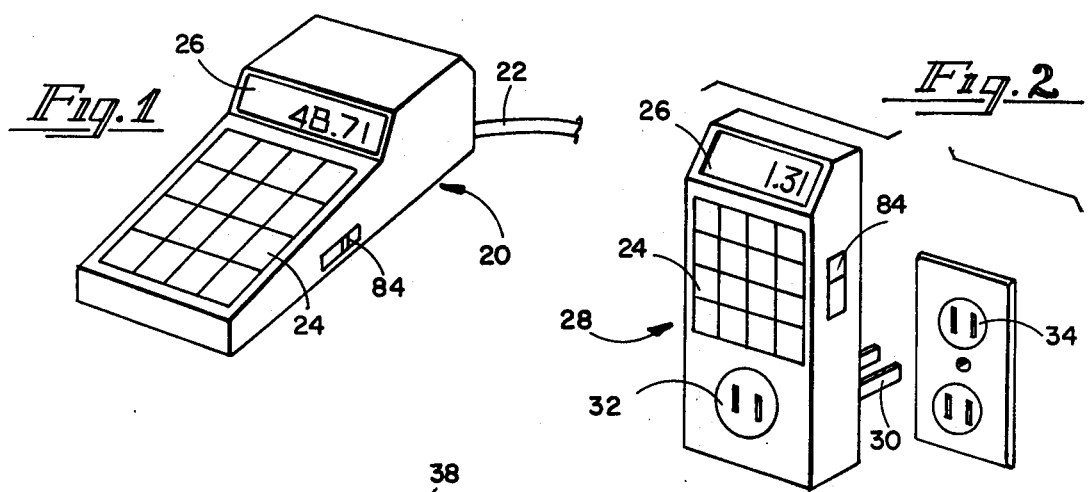
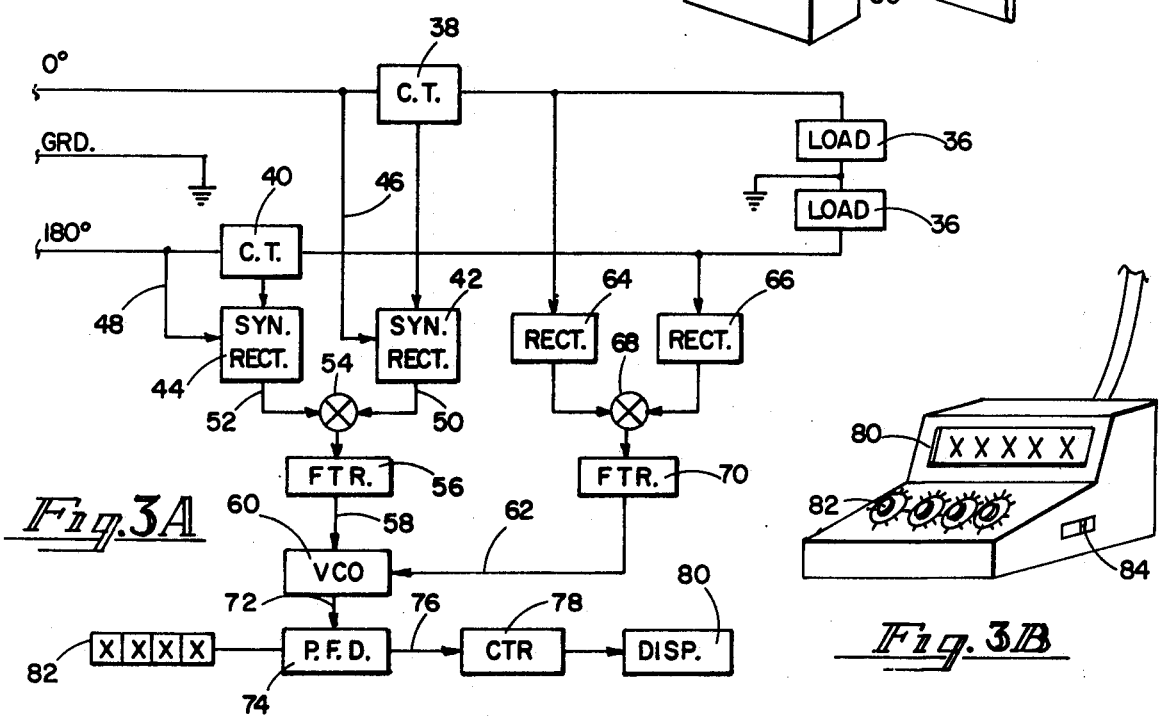
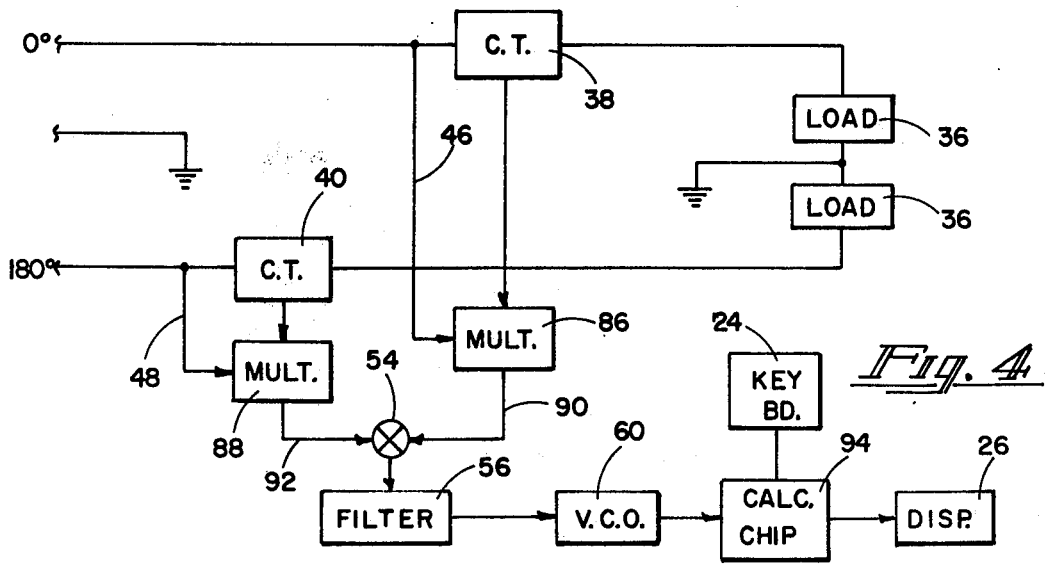

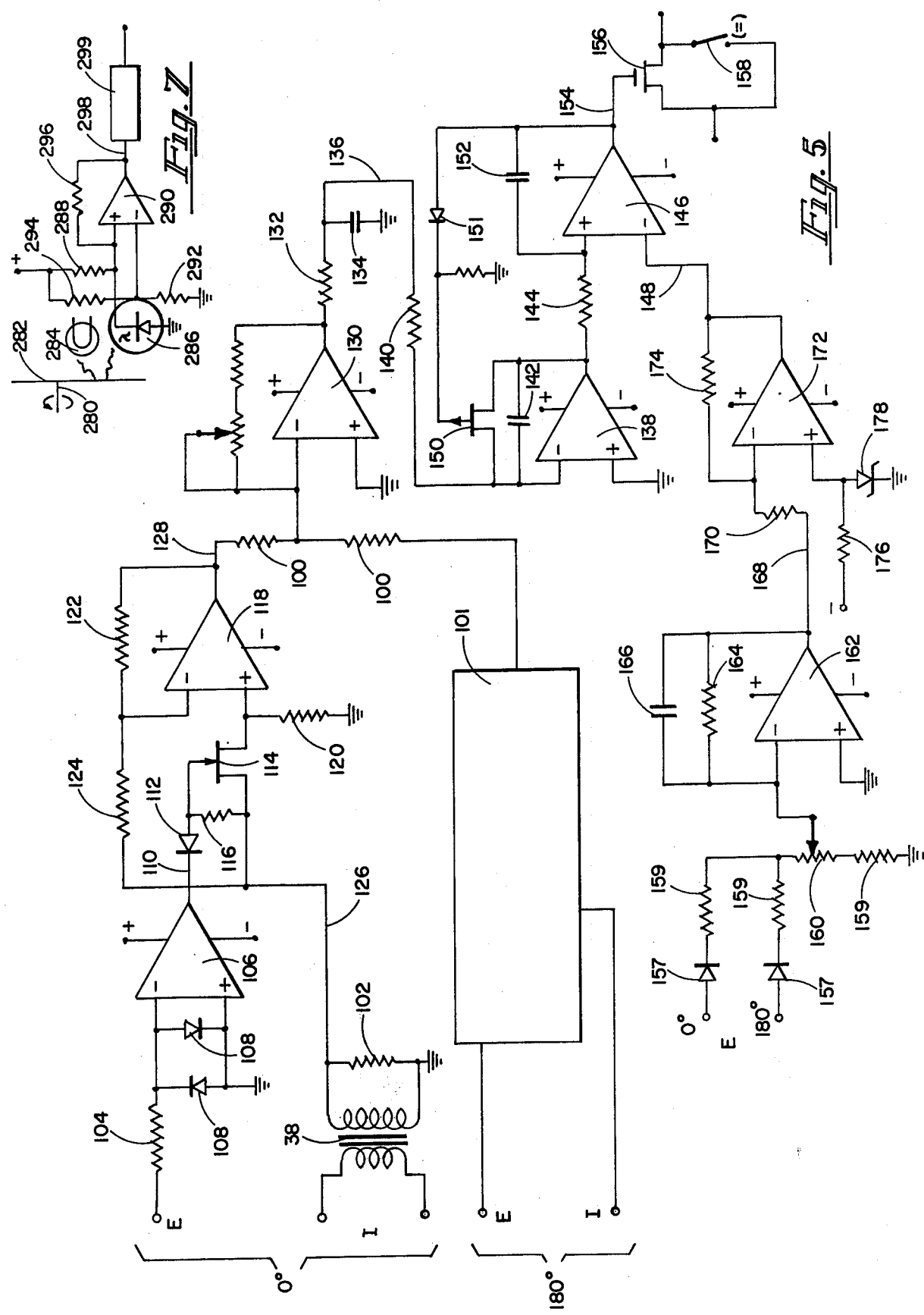

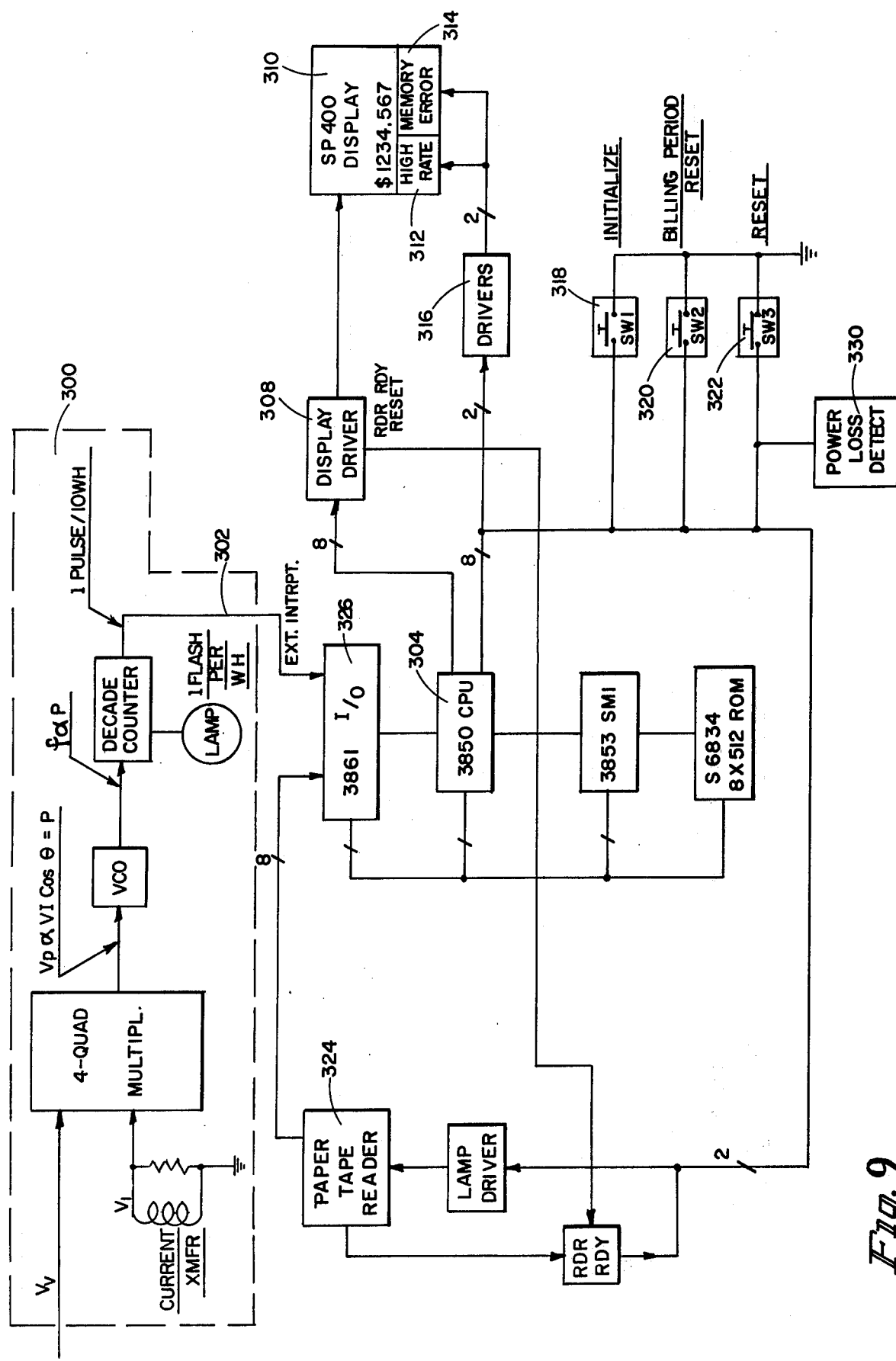

UTILITY USAGE MONITORING SYSTEMS

CROSS REFERENCES TO RELATED APPLICATIONS

This application is a continuation-in-part application of our copending application entitled "Utility Usage Monitoring System", filed July 19, 1976, as Ser. No. 706,679.

BACKGROUND OF THE INVENTION

1. Field of the Invention

The present invention relates to the field of electronic instrumentation, and more particularly to instrumentation for monitoring the rate of usage of a particular utility.

2. Prior Art

Various types of utility monitors are very well known in the prior art. Typical examples are the water meters, gas meters and electric meters generally found on the supply lines to homes and other structures. These common utility meters for water and gas typically have some mechanical part which rotates in response to the flow through the meter, with the rotation being geared down in decades to drive a series of pointers for indicating the consumption in appropriate units, such as gallons or cubic feet. Such meters must be located in the main supply line to be useful for billing purposes, and normally are located outside of any structure so that they may be read without gaining access to the building. Accordingly, such meters are generally not located in a convenient location for reading by the persons actually using the utility, and further do not indicate either the accumulative cost of the utility used or the rate of increase of that cost. Electric power meters are similar, in that a member is electrically driven in rotation at a rate proportional to the power being consumed, the rotation being geared down to drive indicators for accumulating the total energy consumed.

Various meters have been proposed for monitoring a particular utility and providing a numerical readout in dollars and cents rather than in some unit of measure of the utility itself, such as watt-hours (electrical energy), cubic feet (natural gas), etc. These systems generally have a number of disadvantages, however, as they are typically integral with the basic utility monitoring device. By way of example, gear ratios may be changed and dials used to indicate dollars and cents so that an otherwise conventional meter may be used to measure directly in terms of cost of the utility. However, such meters are generally inconveniently located for monitoring purposes, are intended to be used in place of rather than in addition to a conventional meter readout, and the charge per unit of the utility is not easily changed if necessary. Examples of such meters are those disclosed in U.S. Pat. Nos. 796,033, 796,040 and 875,238. Other variable rate meters are also shown in U.S. Pat. Nos. 2,469,673 and 3,683,343.

In U.S. Pat. No. 3,311,824, a device for sensing the rotation of a watt-hour meter element is disclosed. Also, load monitoring and/or control systems for controlling total energy consumption in any given time period are disclosed in U.S. Pat. Nos. 2,994,038, 3,502,980, 3,505,508, 3,552,421, 3,602,703 3,652,838 and 3,872,286.

BRIEF SUMMARY OF THE INVENTION

A utility usage monitoring system for monitoring the consumption or use of a particular utility and displaying the accumulated use in terms of its cost. The rate or usage of the utility is converted to a pulse train with a repetition rate dependent upon the usage. In one embodiment, a calculator chip having an automatic constant capability and coupled to an electronic display is caused to successively execute a summing operation dependent upon the pulse train repetition rate and to provide a cumulative total for display. A keyboard is provided to enter the automatic constant, and to allow the change thereof to provide the proper utility cost or charge. Another embodiment utilizes a microprocessor coupled to a display for displaying the accumulated utility usage, with the microprocessor being programmed to repetitively update the display. Provisions may be made for entering such parameters as base charges and utility cost break points in accordance with the utility billing practice so as to provide a high degree of accuracy in the accumulated readout.

Further embodiments, including forms which may be used to provide substantially automated meter reading and billing, for providing protection against loss of data from power outages, and for providing an audit capability for review of prior billing are disclosed. Also disclosed in a system including a time-keeping capability for allowing variation in charge rates with time of day and/or day of the week and/or automatic print-out at the end of each billing period.

BRIEF DESCRIPTION OF THE DRAWINGS

FIG. 1 is a perspective view of one embodiment of the present invention.

FIG. 2 is a perspective view of an alternate embodiment of the present invention.

FIG. 3A is a block diagram for the circuit of one embodiment of the present invention.

FIG. 3B is a perspective view of a still further alternate embodiment of the present invention.

FIG. 4 is a block diagram of an alternate embodiment of the present invention.

FIG. 5 is a circuit diagrm for one embodiment of the present invention.

FIG. 7 is a schematic diagram for an optical reading device for use with the present invention.

FIGS. 8 and 9 are block diagram illustrating microprocessor based embodiments of the present invention.

DETAILED DESCRIPTION OF THE INVENTION

Figure 6:
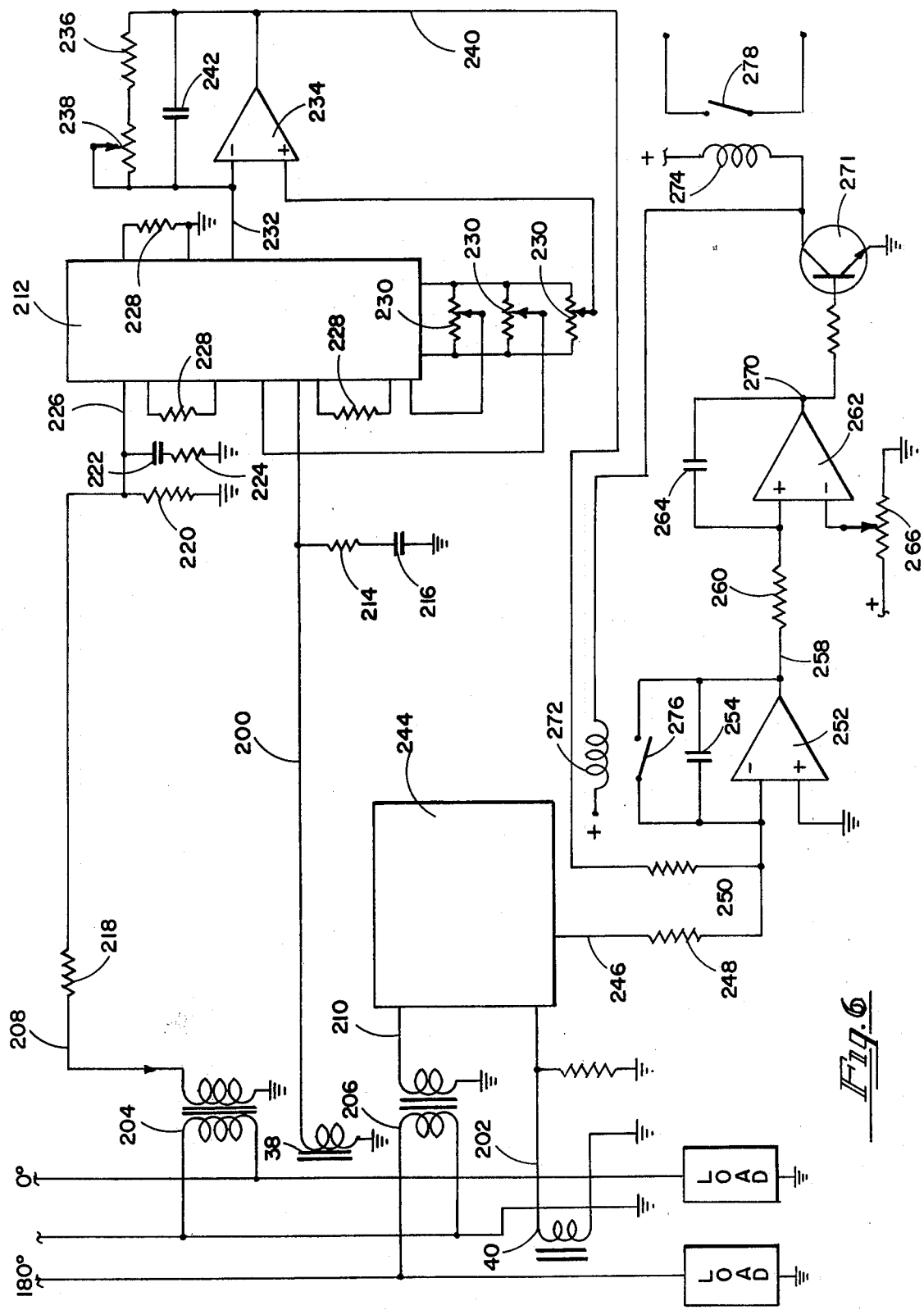
FIG. 6 is a circuit diagram of an alternate embodiment of the present invention.
Figure 6:
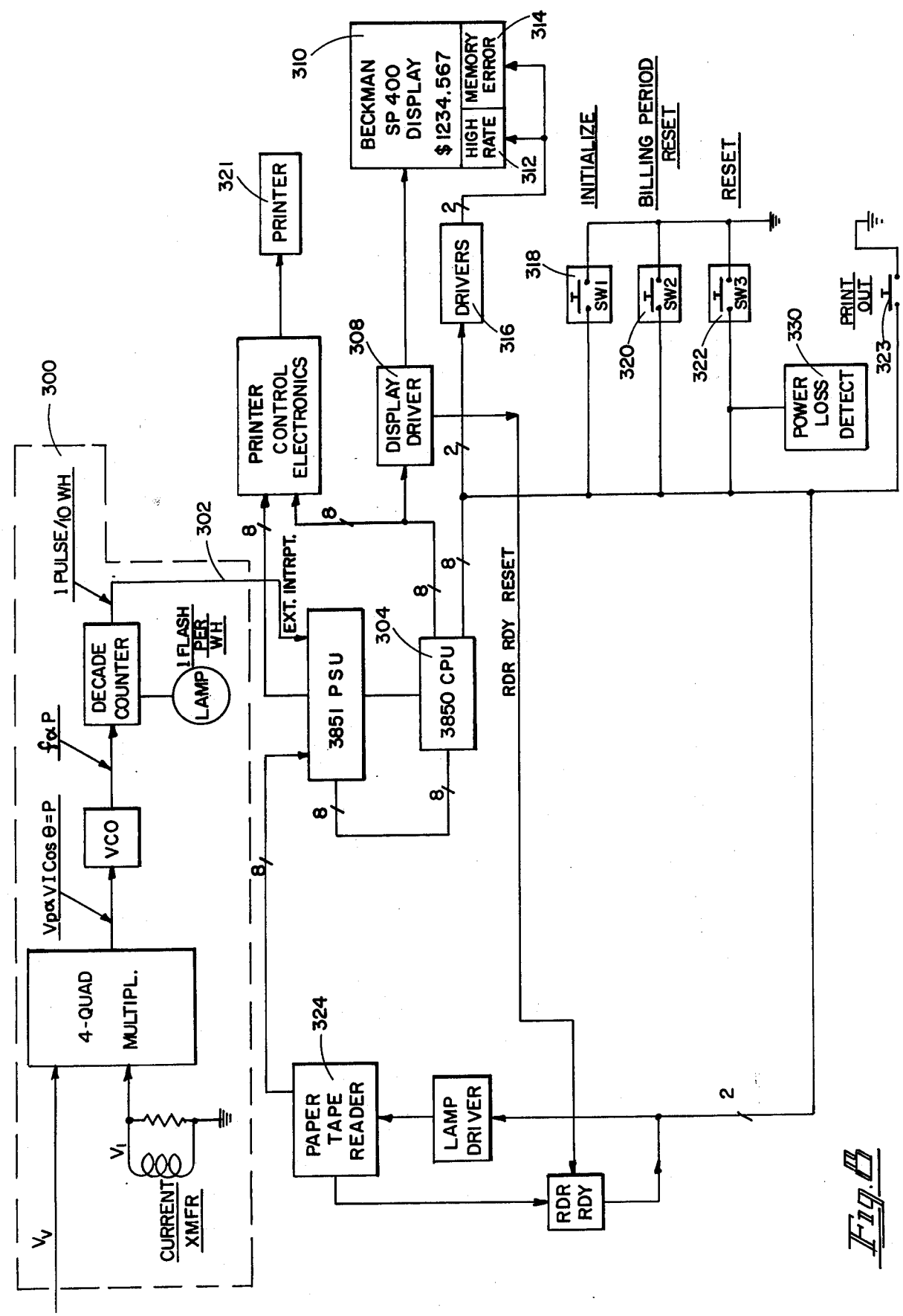

First referring to FIG. 1, a perspective view of one embodiment of the present invention may be seen. This embodiment, the preferred embodiment, is intended for monitoring a utility at any desired location, independent of the usual location of the conventional utility meter. In particular, this embodiment is intended for convenient location for monitoring as opposed to merely occasional reading. By way of example, in the case of homes, the monitor may be located in the family-room or study to be most convenient for this purpose. The monitor of this embodiment, generally indicated by the numeral 20, is coupled through a line 22 to sensors which provide the basic input information with respect to the utility usage for processing and display by the monitor 20. (Details of these sensors for various utilities will be subsequently described.)

The monitor 20 is similar in appearance to a small calculator, being characterized by a keyboard 24 and an electronic display 26. As shall be subsequently seen, the keyboard 24 and electronic display 26 may be of conventional construction, with calculator keyboards and light emitting diode displays being most appropriate for this purpose.

Now referring to FIG. 2 an alternate embodiment of the present invention for monitoring the electric power consumed by a particular plug-in device is shown. In this embodiment, not only is a keyboard 24 and electronic display 26 utilized, but the monitor 28 also includes conventional male and female receptacles 30 and 32, respectively. Thus, the unit may be temporarily coupled between a wall socket 34 and the plug of the device to be monitored to provide convenient individual device monitoring.

The device of FIG. 2, of course, is basically a single phase power monitor, through the concepts of the present invention may be extended to multiple phase systems, either by using appropriate plugs with a device similar to that shown in FIG. 2 for plug-in devices, or using a device similar to that of FIG. 1 for connecting through a line 22 to a multiple phase system. Thus, referring to FIG. 3a, a block diagram for a three wire system driving a load 36 may be seen. Current transformers 38 and 40 provide a measure of the current in the 0° and 180° lines, respectively, for the basic inputs to synchronous rectifiers 42 and 44. Voltage phase reference inputs to a synchronous rectifiers are provided by voltage taps 46 and 48, respectively so that the outputs on lines 50 and 52 are proportional to the current in the respective line times cosine $\theta$, where $f$ is the phase angle between the voltage and current in the line. These two signals are summed at the summing junction 54 and filtered by filter 56 to provide a signal on line 58, as one input to the voltage controlled oscillator 60, proportional to the sum of the current in each line corrected for the power factor. The second input for the voltage controlled oscillator on line 62 is provided by rectifiers 64 and 66, respectively, providing signals to the summing junction 68 proportional to the voltage on the respective lines, with the sum of these two voltages being filtered by filter 70 for input to the voltage controlled oscillator. The output frequency on line 72 is proportional to the power, and is coupled to a programable frequency divider 74 to provide an output on line 76 having a frequency equal to the present rate of usage of the utility. This frequency is integrated by a counter 78 for displaying as the cumulative utility usage on the display 80. Since the programmable frequency divider 74 divides the frequency output from the voltage controlled oscillator 60, the voltage controlled oscillator is pre-set to provide an output frequency corresponding to the maximum anticipated cost per unit of the utility; in this example, the maximum anticipated cost per kilo-watt-hour. Also the output of the voltage controlled oscillator is initially set to correspond to the minimum detectable power level (preferably in the area of 100 watts for most applications). In the preferred form of this embodiment, four decade switches 82 are used to program the frequency divider 74, with the digits of the switches representing the utility units per monetary unit, such as watt-hours per penny. Also as an additional feature, if desired, the display 80, preferably a light emitting diode display, may be caused to wink at a rate proportional to the rate of usage of the utility, thereby highlighting the present rate of consumption of the utility independent of the previously accumulated consumption. (Divide by N frequency dividers are well known in the prior art and available from many sources in integrated circuit forms).

An embodiment utilizing the block diagram of FIG. 3a may be seen in FIG. 3b. This unit is characterized by a plurality of rotary switches 82 and the display 80. A separate clear button may be provided to clear the system as desired, or this may be achieved through the use of an on-off switch 84 (which typically is also used with the embodiments of FIGS. 1 and 2, though if a conventional calculator keyboard is utilized, a clear switch will normally be included therein).

Now referring to FIG. 4, another form of the present invention may be seen. This embodiment is adapted for use in power detection and accumulation for a three wire system such as in FIG. 3a, and illustrates the block diagram of the circuit which might be used with the embodiment of FIG. 1. In this embodiment, current transformers 38 and 40 and voltage taps 46 and 48 are used as before, but are applied to four quadrant multipliers 86 and 88 respectively to provide the product of the voltage, current and cosine of the phase angel therebetween for each of the 0° and 180° lines on lines 90 and 92, respectively. A suitable four quadrant multiplier is the monlithic multiplier manufactured by Motorola Semiconductor as their part No. MC1594L. The outputs on lines 90 and 92 are summed at the summing junction 54 as before, filtered by filter 56, and applied to the voltage controlled oscillator 60.

In this embodiment the output of the voltage controlled oscillator 60 is accumulated in a most unique way for display on the display 26. In particular, a calculator chip 94 having an automatic constant feature is utilized, with the output of the voltage controlled oscillator 60 causing the calculator chip 94 to successively execute summing operations, each time adding the automatic constant to the previous total to provide a new total. The keyboard 24, of course, is utilized to enter the automatic constant, and possibly a starting or initial charge valve. By choosing the voltage controlled oscillator frequency to represent some standard unit of utility consumption per cycle, the automatic constant entered to the keyboard may represent the cost per unit of the utility, so that the accumulated signal displayed by display 26 represents the aggregate or accumulated cost of utility used. A suitable calculator chip having the automatic constant feature is that manufactured by American Microsystems, Inc. and sold as their part No. S9411. The automatic constant, utilizing that specific chip, may be initially entered by entering any number such as zero or some previously accumulated cost, then depressing the plus key, then entering the automatic constant, and depressing the equal (=) key synchronously with the voltage controlled oscillator output. The display will then display the sum of this operation, with each successive depression of the equal key causing the chip to add the automatic constant to the previous total and display the new total on the display. While an electro-mechanical depression of the key could be used, it is preferable to use some form of electronic depression, such as by way of example, turning on a transistor of field-effect device coupled in parallel with the key contacts so as to momentarily electronically provide the switch closure.

Now referring to FIG. 5, a circuit diagram for a system shown in block diagram form in FIG. 3a may be seen. Since the circuit for the 0° and 180° lines of the three-wire system are identical prior to the summing junction comprising resistors 100, only one such circuit, namely that of the 0° line is illustrated in detail, the duplication of the circuit for the 180° line being identified by the block 101. The current transformer 38 has a resistor 102 in parallel therewith so that the output of the transformer is a voltage in phase with and proportional to the current in the 0° line. The voltage in the 0° line is coupled to a relatively high valued resistor 104 to one input of a high open loop gain amplifier 106, with the other input coupled to ground. A pair of diodes 108 limit the differential input to approximately ± 0.7 volts, with the output of amplifier 106 sensing the transition through zero and providing a square wave in phase with 0° voltage. The output of amplifier 106 on line 110 is coupled through diode 112 to the gate of a field-effect transistor 114. Thus, the square wave on line 110 turns off the field-effect device 114 during the negative half cycle of the square wave, with resistor 116 returning the gate-source voltage to zero to turn the field-effect device 114 on during the positive portion of the square wave. The positive input for operational amplifier 118 is coupled to ground through a resistor 120, a relatively high valued resistor in comparison to the resistor 102 in parallel with the current transformer. By making the feedback resistor 122 equal to resistor 124, the circuit will have a gain with respect to the signal on line 126 which alternates between +1 and −1 in response to the square wave on line 110. Accordingly, the output of the circuit on line 128 has an average value which is proportional to the current times cosine $\theta$, where $\theta$ is the phase angle between the voltage and current in the first or zero degree line.

The 0° and 180° signals are summed by the summing resistors 100 and amplified through operational amplifier 130, with the output signal thereof being filtered by the combination of resistor 132 and capacitor 134. The voltage appearing on line 136 is converted to an input current to the negative input terminal of operational amplifier 138 by a series resistor 140, with a feedback capacitor 142 providing current feedback from an amplifier output. With this connection the amplifier functions as an integrator, with the output thereof being proportional to the time integral of the voltage appearing on line 136. This output voltage is coupled through a resistor 144 to the positive input of amplifier 146 which serves as a threshold detector. Thus, the output of amplifier 146 will switch from the positive limit to the negative limit when the voltage from resistor 144 is less than the voltage on line 148, thereby pulsing field-effect device 150 ON through diode 151 to discharge the capacitor 142. A feedback capacitor 152 in cooperation with resistor 144 provides a sufficient pulse width in the positive going output pulse of amplifier 146 to allow substantially complete discharge of capacitor 142 through the field-effect device 150.

The negative voltage reference on line 148 could be simply a negative voltage reference, which is conjunction with the scaling of the circuitry would provide an output pulse rate on line 154 proportional to the current times the cosine of the phase angle times a pre-determined standard voltage, such as by way of example, 110 volts. In the alternative, a first order correction for voltage variations may be provided by providing a voltage responsive reference on line 148. For this purpose, the voltages of the 0° and 180° lines are rectified by diodes 157 and summed and divided down by resistors 159 and adjustment potentiometer 160 to provide one input to operational amplifier 162 having a feedback resistor 164 and a feedback capacitor 166. The output voltage on line 168 is proportional to the sum of the 0° and 180° voltages. This signal is applifed through resistors 170 to one input of operational amplifier 172. This amplifier has a relatively low gain as a result of feedback resistor 174, which is approximately the same magnitude as the input resistor 170. The other input for amplifier 172 is a negative reference voltage provided by a resistor 176 and a Zener diode 178. Accordingly, the reference on line 148 is responsive to variations in the otherwise assumed constant supply voltage, altering the frequency of the pulse train on line 154 in response thereto. In accordance with the prior description, the pulse train on line 154 may be used to trigger a field-effect device 156 in parallel with the equal key 158 to cause the calculator chip to successively execute the summing operation to successively add the automatic constant to the running total.

Now referring to FIG. 6, a detailed circuit diagram for the embodiment of FIG. 4 may be seen. As before, the current transformers 38 and 40 (See FIG. 4) provide a voltage on lines 200 and 202 proportional to the current in the 0° and 180° power phases, respectively. In addition, stepdown transformers 204 and 206 provides voltage signals on lines 208 and 210, respectively. For this 0° phase, the current signal on line 200 is applied to one input of a four quadrant multiplier 212, with the combination of resistor 214 and capacitor 216 providing attenuation of high frequency noise (having negligible energy content anyway). For the voltage signal on line 208, a voltage divider comprised or resistors 218 and 220 provides a further reduction in the voltage level, with capacitor 222 and resistor 224 providing similar high-frequency filtering for the voltage input of line 226 to the second input of the multiplier 212. The multiplier itself may be any suitable four-quadrant multiplier, though for convenience, monolithic multipliers such as the MC-1594L previously referred to are preferred as providing good performance at a low cost and in a package. (The various resistors 228 and the potentiometers 230 provide trimming, etc. in accordance with the manufacturer's recommendation for the MC-1594L). The multiplier 212 provides direct multiplication of the instantaneous voltage and current in the 0° phase, thereby providing an output product on line 232 equal to the instantaneous power being consumed in that phase. Since the voltage and current wave forms are 60 hz sine waves, displaced in time dependent upon the phase angle between the voltage and current in that phase (e.g. the power factor of the load), the signal (current) on line 232 will contain a substantially constant component representing the average power actually being consumed, and a twice-power frequency component (e.g. 120 hz), which component averages to zero over any full cycle.

The output on line 232 is converted from a current to a voltage by operational amplifier 234 having an adjustable feedback through the network comprised of resistor 236 and variable resistor 238 so as to provide a gain control for the power signal on line 240 (corresponding to line 90 in FIG. 4). The capacitor 242 provides increased feedback for higher frequency noise components, thereby substantially attenuating those components in the signal on line 240. (Operational amplifier 234 is connected with the input signal on the negative input and the nulling signal on the positive input, so that the signal on line 240 actually represents the inverse or negative of the instantaneous power.)

The circuitry immediately herein before described with respect to the 0° phase is repeated as circuitry 234, shown only in block form, for the 180° phase, resulting in a signal on line 246 representing the instantaneous power in the second phase of the power system. These two signals are summed by the combination of summing resistors 248 and 250, with the sum being coupled to the inverting input of operational amplifier 252. This amplifier has a relatively large capacitive feedback by way of capacitor 254, with a switch 256 coupled across the capacitor for dumping the charge accumulation thereof. Accordingly, the output of amplifier 252 on line 258 represents the integral of the instantaneous power in the two phases, with the integration period running from the time of last switch opening of switch 276. The signal on line 258 in turn is coupled through resistor 260 to the noninverting input of operational amplifier 262. This amplifier has a relatively small capacitor 264 providing feedback therefore, and has its inverting terminal coupled to a reference voltage source through potentiometer 266, so that the combination is operative as a comparator. In particular, when the voltage on line 258 is lower than the reference voltage applied to the negative terminal of operational amplifier 262, the output on line 270 remains negative so that transistor 271 is off, thereby not energizing the relay coils 272 and 274. However, when the voltage on line 258 becomes more positive than the reference voltage applied to the inverting terminal of amplifier 262, the output of the amplifier on line 270 jumps to the positive extreme, (with capacitor 264 providing positive feedback for the voltage swing) pulsing the relays, closing switch 276 to dump the charge on capacitor 254 and also closing switch 278 to operate the equals key to increase the accumulated sum in accordance with the unit of power consumed represented by the charge in capacitor 254. The voltage on line 258 is very quickly responsive to the charge, or lack thereof on capacitor 254 on the closing of switch 276, though the feedback capacitor 264 for amplifier 262 provides some hysteresis in the comparator, thereby holding the comparator output on line 270 positive long enough to ensure proper operation of the relays and full dumping of the charge on capacitor 254. Obviously, scaling may be set as desired, so that each cycle of integration and dumping of the charge on capacitor 254 represents a convenient unit of energy for updating the display.

In the embodiments herein before described, power is measured by detecting the voltage and current, and providing an output responsive to the product thereof. More particularly, analog voltage and current signals are basically multiplied to provide an analog signal representative of the instantaneous power being consumed, with a form of voltage controlled oscillator then converting the analog power signal to a frequency proportional to the power being used. However, it is to be understood that other types of power detection (or for that matter non-electrical utility usage such as gas, water, etc.) may be used with the present invention. By way of specific example, FIG. 7 presents a block diagram of a circuit for directly reading a meter such as a watt-hour meter, a gas meter, etc. In this figure, a wheel 282 having alternate regions of dull black and reflective portions is mounted on the shaft 280 of the basic meter movement, with the wheel 282 being illuminate by a small light source 284. A photodiode 286 is coupled in series with the resistor 288 to a positive voltage, with the junction therebetween coupled to the positive input of threshold detector 290. Thus when the reflection from light source 284 off of wheel 282 is relatively high, the resistance of the photodiode 286 is low so as to hold the noninverting input to the threshold detector 290 at a relatively low value. However, when the reflection is a minimum, photodiode 286 has a relatively high resistance so that resistor 288 will raise the voltage to the noninverting input of the threshold detector 290 to a relatively high value. A voltage divider 294 provides a constant reference voltage to the inverting terminal of the threshold detector 290 so that the alternate light and dark regions of wheel 282 cause negative and positive differential input voltages, respectively, to the threshold detector. (A relatively high value feedback resistor 296 may be used to provide a small amount of positive feedback, thereby providing some hysteresis around the switching point to avoid any uncertainty in the switching.) The output signal on line 298 provides a direct reading of the meter movement, which may be directly used to effectively operate the equals key for the calculator chip, or if desired may be divided down by a conventional divider 299 to provide a lower frequency digital signal representative of the utility being used. (Of course, as an alternative, the light source and light sensitive device may be disposed on opposite sides of the moving member and operative through an appropriate opening in the member.)

The embodiments herein before described have provided apparatus for the accumulation of the consumption of a particular utility, and the display of that consumption in monetary figures generally using a conversion factor which may be manually entered into the device dependent upon the proper, or alternatively the best approximation for the conversion. In some instances, however, such a system may only provide an approximation of the utility consumption in monetary values because of additional factors, such as fixed base charges independent of consumption, and rate changes at pre-determined consumption levels. By way of specific example, a power company charge may include a fixed periodic base charge, a first rate per kilowatt-hour up to a given consumption level for each period, and a second rate for consumption above the break point during the period. Accordingly in such a case, it would be most desirable to be able to track the consumption in monetary terms accurately throughout the period, and thus automatically insert the base charge and change the rate at the designated break point. Ideally, the base charge and break point should be alterable by the user of the device so that a device of a given design may be changed when rates are changed, and may be used for any power (utility) company regardless of their base charges, rates, and break points. To achieve the foregoing goals, one embodiment of the present invention utilizes a commercially available microprocessor to receive and store the basic data, and to automatically apply the base charges, break points, etc. to provide highly accurate utility monitoring throughout any charge period.

Such an embodiment is shown in block diagram form in FIG. 8. In this embodiment, a means 300 is provided for tracking the utility usage in quantitative terms and providing a pulse rate (repetition rate) on line 302 in direct proportion to the utility usage. In the case of a monitor for electrical energy usage, the utility tracking means 300 might be the circuit of FIG. 6 for providing the signal on line 270, or in the alternative, the circuit shown in block digram in FIG. 3A for providing the signal on line 72. Preferably, the repetition rate of the signal on line 302 is normalized (scaled) in some fashion, such as by way of example, for an electrical monitor a repetition rate of once per ten watt-hours of consumption is convenient. In this particular embodiment, the microprocessor used is the F8 manufactured by the Semiconductor Components Group of the Fairchild Camera and Instrument Corp., Mountainview, Calif. The F8 system is believed ideal for use in this embodiment because of the ability to achieve the computational requirement with a micro-processor system comprising only two chips, in particular the 3850 central processing unit, and the 3851 program storage unit (both F8 system components). The 3850 central processing unit, aside from providing the functions of a central processor, includes 64 bytes of scratch pad random access memory (RAM), and 16 bits of internally latched bi-directional input/output. The scratch pad memory provides adequate storage for the variable data needed to achieve the desired result (base rates, break points, etc.) thereby avoiding the requirement of independent RAM storage capability. The 3851 program storage unit, on the other hand, provides 1024 bytes of mask programmable read-only memory (ROM) for program and constant storage, addressing logic for memory referencing, a program counter, an indirect address register (the data counter) and a stack register. In addition, the program storage unit includes a vectored interrupt level, with an external interrupt line to alert the central processing unit. The output on eight of the sixteen I/O lines are coupled to a display driver 308 driving a display 310. In this embodiment a seven-digit gas discharge display manufactured by Beckman as their SP 400 is used, with the display further including indicators 312 and 314 to provide an indication of whether the first or second rate is being applied and to indicate a memory error. These additional indicators are driven through suitable drivers 316 from two of the additional eight I/O lines in the 3850 CPU 304. The additional I/O lines in the second group are coupled to a manual switch 318 to initialize the system, a reset switch 320 to reset the system for monitoring a new charge period, and to a system reset switch 322 (also coupled to the power loss detector). Of course, other inputs and/or outputs may also be incorporated if desired, such as by way of example, some form of recording device to record the accumulated consumptions upon actuation of the reset switch 320 to record the accumulated consumption immediately prior to restarting the system for the next charge period, such as a printer 321 driven by conventional printer control electronics 323, initiated by a print out switch 323.

For purposes of specificity, the function of the embodiment in FIG. 8 will be described with respect to an electrical energy monitor for monitoring electrical energy consumption for a utility having a fixed periodic charge, a first charge rate below a given break point, and a second charge rate above a given break point. The system is programmed so that upon pressing the initialize switch 318, the lamp is turned on for the paper tape reader 324 and the system is set for the entry of data. A paper tape having a suitable leader is then manually drawn through the paper tape reader 324 (which may be of conventional construction well known in the art) to sequentially enter the basic information into the system, more specifically, the high rate charge, the low rate charge, the fixed charge, and the break point between charge rates. In addition, in this embodiment a threshold value is added representing the maximum desired energy consumption above which the system will cause a flashing of the display, thereby effectively displaying not only the accumulated charge, but also the fact that the present rate exceeds a predetermined goal or allowance. After the data is read in by the paper tape, (which may be supplied by the utility company and/or the manufacturer of the monitor based on knowledge of the particular utility being monitored and their charge rates) the system turns off the lamp in the tape reader and does a test of the input data using standard checksum procedures well known in the computer art. If there was a read error of any kind, the user is signaled to re-enter the tape. If checksum is verified, the various memories are initialized in the same manner as for the billing period reset (dollars register reset to initial charge, rate set back to low, etc.), and the system enters a display scan routine to initially display the fixed periodic charge.

A pulse on line 302 representing the consumption of the normalized unit of energy provides a vectored interrupt, resulting in a jump to an interrupt update routine which determines which rate should be applied based upon the energy already consumed and updates the accumulated charge by applying the proper rate to the unit of energy consumed as indicated by the pulse on line 302, increasing the total being displayed accordingly. At the end of the interrupt update routine the program branches to the display scan routine, maintaining the display and awaiting the next interrupt indicating the consumption of an additional unit of the utility being monitored. One of the features of the interrupt update routine is a capability of noting the time between interrupts, and, if that time is below a predetermined interval indicating consumption of the utility at a rate higher than a predetermined threshold, causing the display to flash. In one embodiment the threshold value is also one of the variables which is entered by the input device (in this embodiment the paper tape reader).

At the end of each billing period the system is reset by depression of the Reset Switch 320, which for many utilities is a bimonthly cycle. This reset (update or bimonthly restart) enters the base charge in place of the previously accumulated total, returning to the scan mode in readiness for interrupts indicating incremental utility usage. Thus, the primary routines for the program are (i) an initialize routine; (ii) a display scan routine; (iii) a restart for the bimonthly reset routine; and (iv) a reset routine for manual resetting, power loss and as part of the bimonthly reset routine.

Now referring to FIG. 9, an alternate embodiment utilizing the same concepts as the embodiment of FIG. 8, but replacing the 3851 read only memory with a 3861 I/O device and incorporating a 3853 static memory interface device and an S6834 read only memory for program storage may be seen. (The 3861 and 3853 devices are F8 family devices, and the S6834 is an 8X512 ROM manufactured by American Microsystems Inc. of Santa Clara, California.) In this embodiment the interrupt and the tape reader input are directed through the I/O device 326, specifically the 3861 device, and a printer has not been included. However, conceptually the operational system is identical to that hereinbefore described with respect to FIG. 8, though the read only memory is erasable and may be altered if desired without changing any of the components of the system.

As an example of the nature of a program which may be used to achieve the hereinbefore described functions of the system of FIG. 8 except for the printer control function, a complete program listing to achieve these same functions on the system of FIG. 9 is herein provided. It must be understood however, that such a program is exemplary only, and of course specifically adapted to the F8 system, though similar programs for other microprocessor based energy monitors in accordance with the present invention may readily be derived by persons of reasonable skill in the art.

```
                    XFLGS   EQU     0           EXTERNAL FLAGS PORT
                    XDISPL  EQU     1           DISPLAY PORT
                    RDPORT  EQU     5           TAPE READER PORT
                    INCWRD  EQU     6           INTERRUPT CONTROL WRD IN 3861
                    ::
                    ::  RESET ROUTINE -MANUAL RST,POWER LOSS,OR FROM
                    ::      UPDATE OR BIMONTHLY RESTART......
0000 1A             RESET   DI                  DISABLE INTERRUPT
0001 71                     LIS     1           SET INTERRUPT CTL WRD
0002 B6                     OUTS    INCWRD      ENABLE EXT INTERRUPT
0003 A0                     INS     XFLGS       EXTERNAL FLAGS
0004 21 03                  NI      H'03'       CLR XFLGS EXCEPT RATE & FLSH
0006 B0                     OUTS    XFLGS       EXTERNAL FLAGS
0007 70             CKSM    LIS     0           ZERO CKSM R0
0008 50                     LR      0,A
0009 20 24                  LI      H'24'       1ST WRD TO BE CKD
000B 0B             MORR    LR      IS,A        FIX ISAR
000C 40                     LR      A,0         GET CKSM ACCUMULATION
000D CC                     AS      S           ADD PRESENT BYTE
000E 50                     LR      0,A         STORE NEW CKSM
000F 0A                     LR      A,IS        GET ISAR
0010 1F                     INC                 INCREMENT IT
0011 25 32                  CI      H'32'       LAST WRD?
0013 81 F7                  BP      MORR        GET ANOTHER IF ISAR°33
0015 30             DONE    DS      0           TEST CKSM FOR ZERO
0016 92 05                  BNC     RSETTB      IF CKSM=0 O.K.
0018 A0             ERROR   INS     XFLGS       EXTERNAL FLAGS
0019 22 04                  OI      H'04'       SET XMERR=1
001B B0                     OUTS    XFLGS       EXTERNAL FLAGS
001C 66             RSETTB  LISU    6           RESET TIME BUCKET VALUE
001D 69                     LISL    1           ISAR=61 OCTAL
001E 4E                     LR      A,D         GET TTHI;ISAR GOES TO 60
001F 55                     LR      5,A         PUT IN TBHI
0020 4C                     LR      A,S         GET TTLO
0021 54                     LR      4,A         PUT IN TBLO
                    ::  DISPLAY SCAN ROUTINE......
0022 76             SCAN    LIS     6
0023 50                     LR      0,A         KOUNT=6 (R0)
0024 24 1B          ODD     AI      H'1B'       IF A=KOUNT,ISAR=K+BASE
0026 0B                     LR      IS,A        FIX ISAR
0027 4C                     LR      A,S         GET WORD = 2 DIGITS
0028 15                     SL      4           SHIFT TO GET LOWER DIGIT
0029 52                     LR      2,A         STORE IN TEMP R2
002A 28 00 3F               PI      OUTD        COMBINE DATA&KOUNT,DISPL.,DECR.KOUNT
002D 40                     LR      A,0         GET KOUNT AFTER DECR IN OUTD SUBR
002E 25 03                  CI      H'03'       KOUNT < 3?
0030 91 F3                  BM      ODD         YES
0032 24 1E          EVEN    AI      H'1E'       KOUNT+BASE#2
0034 0B                     LR      IS,A        FIX ISAR
0035 4C                     LR      A,S         GET WORD OF 2 DIGITS
0036 21 F0                  NI      H'F0'       MASK OUT LS DIGIT
0038 52                     LR      2,A         STORE IN TEMP R2
0039 28 00 3F               PI      OUTD
003C 40                     LR      A,0         GET KOUNT AFTER DECR IN OUTD SUBR
003D 90 F4                  BR      EVEN
003F 42             OUTD    LR      A,2         GET DATA FROM TEMP
0040 C0                     AS      0           ADD KOUNT
0041 18                     COM                 COMPLEMENT TO INVERT OUTPUTS
0042 B1                     OUTS    XDISPL      OUT TO DISPLAY PORT
0043 20 68                  LI      H'68'       TIME DELAY TO GIVE 10MS/TOTAL SCAN
0045 1F             SDELAY  INC                 9US/PASS
0046 92 FE                  BNC     SDELAY      UNTIL A=0
0048 30                     DS      0           DECR.KOUNT
0049 91 02                  BM      SCEND       LAST KOUNT WAS 0 SO FINISHED
004B 1C                     POP                 RETURN
004C 70             SCEND   LIS     0
```

```
004D B1                OUTS   XDISPL  CLEAR DISPLAY OUTPUT
004E 1A                DI             DISABLE INTERRUPT IN CASE COMMAND
004F A0                INS    XFLGS   EXTERNAL FLAGS
0050 91 13             BM     INIT    BIT 7 IS GROUNDED
0052 13                SL     1       SHIFT LEFT 1 TO LOOK AT BIT 6
0053 91 42             BM     GRSTRT  BIT 6 GROUNDED
0055 1B                EI             ENABLE INTERRUPT.IF NO COMMAND
0056 34       TBDCR    DS     4       DECR R4=TBLO
0057 82 CA             BC     SCAN    PREV VALUE NOT 00
0059 35                DS     5       DECR R5=TBHI
005A 82 C7             BC     SCAN    PREV VALUE NOT 00
005C 70       CLFLSH   LIS    0
005D 53                LR     3,A     R3=0=NO FLASH
005E A0                INS    XFLGS   EXTERNAL FLAGS
005F 21 05             NI     H'05'   SET BIT1=0 FOR NO FLASH
0061 B0                OUTS   XFLGS   EXTERNAL FLAGS
0062 90 BF             BR     SCAN
              :: INITIALIZE ROUTINE......
0064 20 10    INIT     LI     H'10'
0066 B0       TAPE     OUTS   XFLGS   RDR LAMP ON, CLR OTHER XFLGS
0067 70                LIS    0
0068 B5                OUTS   RDPORT  CLEAR TAPE INPUT PORT
0069 52                LR     2,A     ZERO CKSM ACCUMULATOR R2
006A 28 00 89 SKPLDR   PI     GTBYTE  GET A BYTE FROM READER
006D 30                DS     0       CHECK FOR LEADER
006E 92 FB             BNC    SKPLDR  NO CARRY MEANS LEADER
              :: NOTE THAT 1ST NON LDR BYTE IS DISCARDED......
0070 20 24             LI     H'24'   1ST REG TO LOAD
0072 0B       MORE     LR     IS,A    ISAR=ACC
0073 28 00 89          PI     GTBYTE  GET A BYTE FROM READER
0076 40                LR     A,0     RETRIEVE THE BYTE FROM TEMP
0077 5C                LR     S,A     STORE PER ISAR
0078 C2                AS     2       ADD CKSM
0079 52                LR     2,A     STORE NEW CKSM
007A 0A                LR     A,IS    GET ISAR
007B 1F                INC            INCREMENT IT
007C 25 32             CI     H'32'   ISAR L.E.32?
007E 81 F3             BP     MORE    YES
0080 72                LIS    2       TENTATIVE FLASH FOR FAIL
0081 B0                OUTS   XFLGS   RDR LAMP OFF,XFLGS
0082 32                DS     2       TEST CKSM FOR ZERO
0083 92 54             BNC    RSTART  CKSM=0=O.K.
0085 78                LIS    8       DISPLAY AN"F" DIGIT 0
0086 B1                OUTS   XDISPL   TO SHOW LOAD FAILURE
0087 90 FF    HALT     BR     HALT    LOCK UP LOOP FOR RDR LOAD ERROR
              ::
0089 A0       GTBYTE   INS    XFLGS
008A 15                SL     4       CHECK RDR RDY FLAG
008B 81 FD             BP     GTBYTE  NOT RDY YET
008D A5                INS    RDPORT  GET READER BYTE
008E 50                LR     0,A     STORE IT IN TEMP R0
008F 15                SL     4       MOV LS DIGIT TO MS POSIT.
0090 24 07             AI     H'07'   ADD A 7
0092 B1                OUTS   XDISPL  X7=RESET RDR RDY FF
0093 1F                INC            INCREMENT TO X8
0094 B1                OUTS   XDISPL  X8 TO DISPLAY=LS DIGIT
0095 1C                POP            RETURN
              ::
0096 90 41    GRSTRT   BR     RSTART  BRANCH HOP FROM SCEND
              ORG      H'A0'
              :: INTERRUPT GOES HERE FOR 3861-E
00A0 41       UPDATE   LR     A,1     R1 IS IRATE FOR RATE
00A1 25 28             CI     H'28'   SEE IF ALREADY HI RATE
00A3 84 11             BZ     ADD     YEP,SO SKIP DECREMENTS
00A5 36                DS     6       DECR ENERGY LO
00A6 82 0E             BC     ADD     PREV VALUE NOT 00
00A8 37                DS     7       DECR ENERGY MID
00A9 82 0B             BC     ADD     PREV VALUE NOT 00
00AB 38                DS     8       DECR ENERGY HI
00AC 82 08             BC     ADD     PREV VALUE NOT 00
00AE 20 28             LI     H'28'
00B0 51                LR     1,A     IRATE=28 FOR HI RATE
```

```
00B1 A0                  INS    XFLGS     EXTERNAL FLAGS
00B2 22 01               OI     H'01'     XRATE=1 FOR HI RATE
00B4 B0                  OUTS   XFLGS     EXTERNAL FLAGS
00B5 20 66      ADD      LI     H'66'
00B7 50                  LR     0,A       R0=CONSTANT &66
00B8 6C                  LISL   4
00B9 60         ADD1     LISU   0         REMOVE ISARU
00BA 0A                  LR     A,IS      GET ISAR
00BB C1                  AS     1         ADD IN R1 TO GET ISARU
00BC 0B                  LR     IS,A      FIX ISAR
00BD 40                  LR     A,0       GET CONSTANT &66
00BE CC                  AS     S         ADD PROPER RATE DIGIT
00BF 63                  LISU   3         CHG ISARU TO GET DOLLARS
00C0 DC                  ASD    S         DECIMAL ADD $ DIGIT
00C1 5D                  LR     I,A       STORE IN $ DIGIT,INCR ISARL
00C2 4C                  LR     A,S       GET NEXT $ DIGIT
00C3 19                  LNK              ADD IN ANY CARRY
00C4 5C                  LR     S,A       PUT BACK IN $ DIGIT
00C5 8F F3               BR7    ADD1      BR BACK UNLESS ISARL=7
00C7 D0                  ASD    0         DECIMAL ADD IN THE &66
00C8 5D                  LR     I,A       STORE IN 37 & INCR ISAR TO 30
00C9 64                  LISU   4         ISAR=40 OCTAL
00CA 4C                  LR     A,S       GET R40 $ WORD
00CB 19                  LNK              ADD IN ANY CARRY
00CC D0                  ASD    0         DECIMAL ADD IN CONSTANT &66
00CD 5D                  LR     I,A       STORE IN $ R40, ISAR=41
00CE 4C                  LR     A,S       GET R41
00CF 19                  LNK              COMBINE ANY CARRY
00D0 D0                  ASD    0         DECIMAL ADD IN CONSTANT &66
00D1 5C                  LR     S,A       STORE IN R41
00D2 A0         TIMCHK   INS    XFLGS     EXTERNAL FLAGS
00D3 21 05               NI     H'05'     CL FLSH XFLG,RETAIN OTHERS
00D5 C3                  AS     3         ADD IFLSH R3(=2-FLSH;=0-NOFLSH)
00D6 90 1C               BR     SIFLSH    GO USE END OF RESTART TO SET IFLSH
                * RESTART FOR BI-MONTHLY RESET
00D8 63         RSTART   LISU   3
00D9 6C                  LISL   4         ISAR=34 OCTAL
00DA 70                  LIS    0
00DB 5D         Z34      LR     I,A       ZEROES 34,34,36 OF $ REGISTER
00DC 8F FE               BR7    Z34
00DE 64                  LISU   4         ISAR=OCTAL 47
00DF 4C         CCHG     LR     A,S       CUST CHG LO
00E0 63                  LISU   3         ISAR=37
00E1 5D                  LR     I,A       PUT IN R37OCTAL & INCR.
00E2 65                  LISU   5         ISAR=OCTAL 50
00E3 4C                  LR     A,S       GET CUST CHG HI
00E4 64                  LISU   4         ISAR=40
00E5 5D                  LR     I,A       STORE 40,ISAR GOES TO 41
00E6 70                  LIS    0
00E7 5C                  LR     S,A       ZERO R41 OF $ REGISTER
00E8 65                  LISU   5         ISAR=51 OCTAL
00E9 4D                  LR     A,I       GET STEP LO,ISAR=52
00EA 56                  LR     6,A       PUT IN ENERGY LO
00EB 4D                  LR     A,I       STEP M,ISAR=53
00EC 57                  LR     7,A       ENERGY MID
00ED 4C                  LR     A,S       STEP HI
00EE 58                  LR     8,A       ENERGY HI
00EF 20 20               LI     H'20'
00F1 51                  LR     1,A       RESET R1 IRATE TO LOW VALUE
00F2 70                  LIS    0         XRATE=0,NO ERROR,NO FLASH
00F3 B0         SIFLSH   OUTS   XFLGS
00F4 72                  LIS    2         R3 IFLSH=2 (FOR FLASH UNLESS
00F5 53                  LR     3,A         CLEARED BY CLFLSH BEFORE NEXT UPDATE)
00F6 29 00 00            JMP    RESET
                         END
NUMBER OF ERRORS=   0
ADD      00B5  ADD1    00B9  CCHG    00DF  CKSM    0007  CLFLSH  005C  DONE    0015
ERROR    0018  EVEN    0032  GRSTRT  0096  GTBYTE  0089  HALT    0087  INCWRD= 0006
INIT     0064  MORE    0072  MORR    000B  ODD     0024  OUTD    003F  RDPORT= 0005
RESET    0000  RSETTB  001C  RSTART  00D8  SCAN    0022  SCEND   004C  SDELAY  0045
SIFLSH   00F3  SKPLDR  006A  TAPE    0066  TBDCR   0056  TIMCHK  00D2  UPDATE  00A0
XDISPL=  0001  XFLGS = 0000  Z34     00DB
S0000
```

There has been described herein new and unique utility monitors for monitoring the consumption or use of a particular utility and displaying the accumulated use in terms of its cost. In the simpler embodiments disclosed herein, a calculator chip is used for computational purposes, allowing the manual input of the charge rates to be used and, if desired, a base charge rate, and further having a reset capability for resetting at the end of any charge period. Such embodiments are particularly useful for utilities which do not have break points in the charge rate, and as an approximation for the accumulating charge for utilities having various break points, etc. However, for accurate monitoring of utilities having base charges, break points, etc., additional embodiments have been disclosed utilizing a microprocessor system capable of storing in memory the various constants as well as the program so as to provide accurate monitoring of the particular utility and to allow changes in the break points, base charges and associated charge rates. This allows the quick adaptation of the system to different utility companies, or the change in rate structure of a particular utility company from time to time.

In the embodiments described herein with respect to FIGS. 8 and 9, the program itself is stored in read only memory (ROM) whereas the base charges, break points, etc., as well as the accumulated charge is stored in random access memory (RAM) on the 3850 CPU chip. Accordingly, in these embodiments a stand-by power system is provided by a power loss detection circuit 330 which detects the loss of line power and couples battery power to the 3850 (e.g., only the 3850) to maintain the random access memory during the power out condition. Obviously, monitoring is not required in an electrical energy monitor during this time, and in order to minimize battery drain, it is generally preferable not to maintain the display during periods of power outage. In certain situations, it may be desirable to use a non-volatile random access memory for the variable data and the accumulated utility usage so that power outages of indefinite periods can readily be tolerated if necessary. Well known core memories are one type of memory which may be used in such situations, though other suitable memories, particularly some just emerging as new developments, are also available or will shortly become available. In that regard it should be noted that with only minor modification, other tasks may readily be accomplished by the systems of the present invention, such as those of FIGS. 8 and 9. By way of example, by coupling the printer and reader by software and/or hardware so that the billing period reset is accomplished under system control rather than manually, the system may be reset at the end of every billing period by running a suitable strip through thr reader, resulting in the printing out of the accumulated totals, preferably both in numeric figures, allowing the user to read the dollar charge directly, and in machine readable code for automatic reading at the utility company. In this manner, meter reading by the utility company is not required. Instead, the utility company may mail to each subscriber an appropriate "billing strip" for each billing period. The subscriber then simply runs the strip through a combination reader-printer assembly to read out the accumulated total and reset the system for the next billing period. Since the numeric print-out would be directly readable by the user, the read-out strip and the subscriber's payment would then be forwarded to the utility company, as with any normal payment. The use of a non-volatile memory in such a system would provide an audit capability so that usage over an interval such as the last twelve billing periods would be retained within the unit for special reading in the event any billing strips were lost. Also, of course, simple interlocks may be incorporated so that the system may not be reset twice by the same billing strip. Further, while the foregoing contemplates the reading out for billing purposes and resetting for the billing cycle at a time which may vary from billing cycle to billing cycle, dependent upon the exact time the subscriber runs the billing strip through the system, the computational capacity of the microprocessor system readily allows the inclusion of a time keeping capability, resulting in the automatic print-out and resetting of the system on a calendar basis maintained by the system itself (perhaps line frequency primarily, and crystal oscillator during power outages) to avoid irregularities in the length of each billing period.

The inclusion of the time keeping function of the present invention opens up other possibilities of substantial economic interest to the utility companies and subscribers alike. In particular, it is well known that electrical energy consumption varies considerably with time of day, with certain periods having a peak power substantially higher than other periods. Since power generating and distribution systems must be capable of providing the peak power when demanded, there is a substantial cost associated with providing the capability of supplying the peak power, regardless of how long or short such demand may last during any twenty-four hour period. Accordingly, there have been many suggestions regarding possible reductions in the peak power load (e.g., the loads on the line during peak power periods) or alternatively, the increase in the charge rate for power consumed during these peak periods. The suggestion of varying the charge rate with time of day has the apparent advantages of varying the charge in accordance with the associated costs of generating and distributing power at the respective times of day, and of discouraging use of unnecessary power during the peak periods. However, most prior art watt-hour meters do not include any time keeping capability, and for that matter, being simple geared structures, would not be easily changed to include any accumulating capability having a scale factor varying with time of day, a function easily accomplished with the present invention. Further, with this capability, simple control signals may also be provided with the present invention to shed certain electrical loads automatically during the peak periods, such as by way of example, electric water heaters, as water heaters will normally retain sufficient hot water during all or a substantial part of the usually identified peak power periods.

Figure 10:
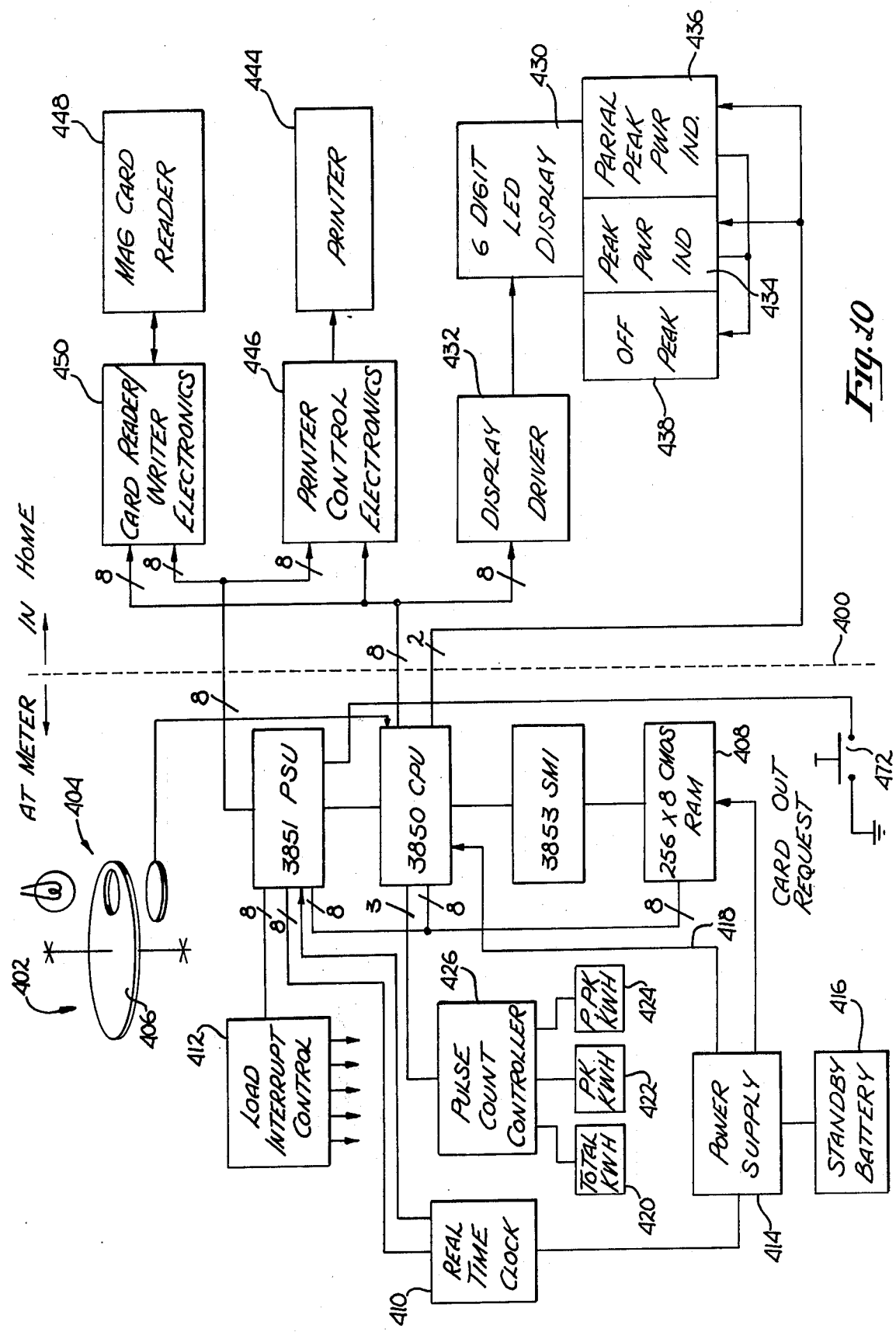
FIG. 10 is a block diagram of a further embodiment of the electrical energy cost monitor.

Now referring to FIG. 10, a block diagram of an embodiment incorporating many of the general concepts hereinbefore discussed may be seen. It will be noted that the block diagram is separated into two portions by the dashed line 400. The left portion of the figure identifies the various portions of the system preferably located at the conventional site for the watt-hour meter, and the right portion of the figure identifies those portions of the system preferably located within the home or other building at a place most likely to be relatively frequently observable. In this system a conventional watt-hour meter movement, indicated by the numeral 402, is provided with a light source photodetector combination, generally indicated by the numeral 404, operative through an opening in the disc 406 of the meter. (Conventional watt-hour meters with any appropriate sensing arrangement are suitable for this purpose.) If a conventional meter is used, the normal dial indicators in the meters may be retained, if desired, to provide an ultimate backup in the event of malfunction of the system.

As before, an F-8 microprocessor system is utilized, comprising the 3851 program storage unit, the 3850 central processing unit and the 3853 semiconductor memory interface unit, with a 256 × 8 CMOS random access memory 408 completing the processor elements. In this system a real time clock 410 is provided so that the month of the year, day of the month and week and time of day information, preferably in fifteen minute increments, is available to the system for such purposes as the automatic print out of billing information at the end of a bill period, the adjustment of rates with time of day, and/or day of the week and the shedding of loads through a load interrupt control 412 during peak hour periods. While the real time clock 410 could be referenced to the 60 cycle line, auxiliary power should be provided for the clock to maintain the clock reference during any periods of power outage. Accordingly, preferably a power supply 414 together with an auxiliary battery 416 is provided to sustain the clock 410 during power outages of up to two weeks. In that regard, crystal controlled timing devices have sufficient accuracy for this purpose without referencing the clock to the line frequency. The standby power 416 is of course controlled by the power supply 414, being coupled in to sustain the random access memory 408 during power outages, the rest of the system being down during such periods. In addition, the power supply actually monitors line voltage, providing a signal on line 418 to the central processing unit indicative of the state of the line voltage. The purpose of this signal is to inhibit the updating of the random access memory from the CPU whenever the line voltage is sufficiently low so as to possibly interfere with the transfer of information from the CPU to the random access memory. This assures that any updating of the random access memory, once initiated, will be completed before the system goes down on any power outage.

For purposes of providing a non-volatile record, three electro-mechanical counters 420, 422 and 424 are provided, each controlled by a pulse count controller 426 controlled by the 3850 CPU. The electro-mechanical counter 420 counts the total kilowatt-hours consumed, which of course should agree incrementally with the meter dials if left in the meter, or provide a substitute for the dials if only the fundamental watt-hour meter movement is utilized with the system. The additional electro-mechanical counters 422 and 424 record the total kilowatt-hours used during any designated peak period and the total kilowatt-hours consumed during any designated partial peak period respectively. In that regard, one of the features of this embodiment of the present invention is the provision for designating one period during any twenty-four hour period during which a different rate charge may be designated, and further for designating a second period during the day during which a still different rate may be charged, these two periods being referred to as the "partial peak" and "peak" power periods.

Figure 11:
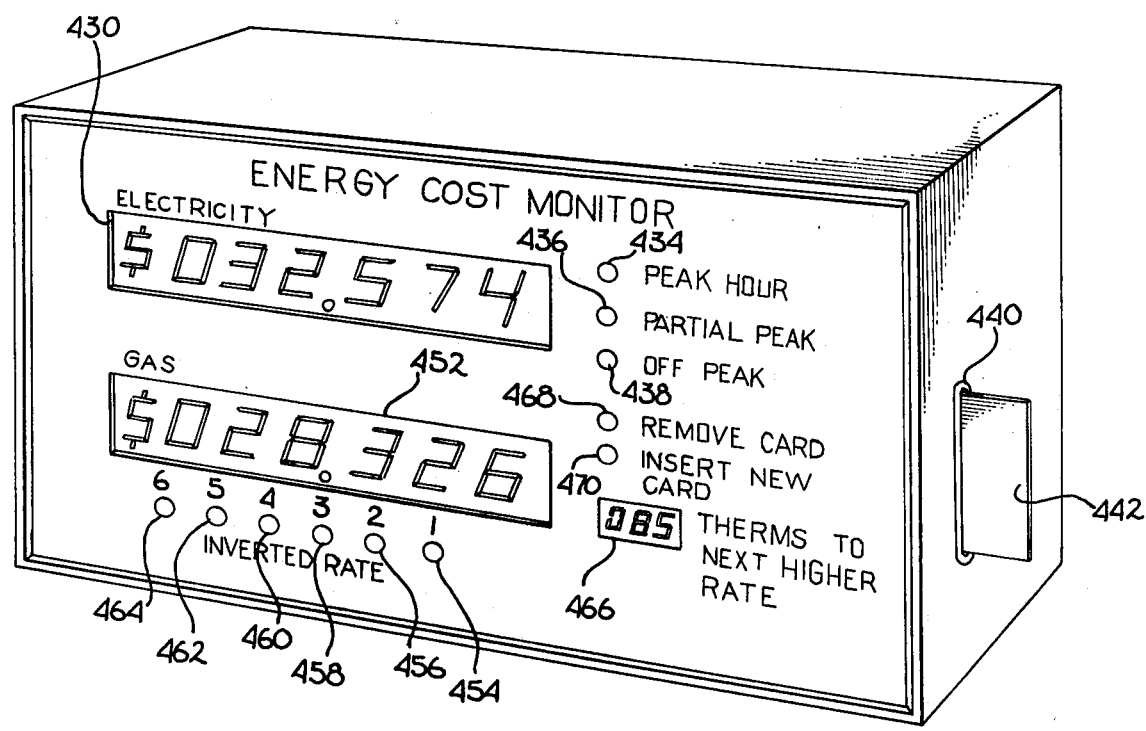
FIG. 11 is a perspective view of a typical display portion of an energy cost monitor which may include both an electrical energy cost monitor and a gas cost monitor.

Now referring to both FIGS. 10 and 11, a block diagram and a perspective view of the portion of the system of this embodiment which is located within the home may be seen. The energy cost monitor shown in FIG. 11 actually monitors both gas and electricity consumption, though at this point, only the electrically monitoring portion will be described. The monitor contains a six digit light emitting diode display 430 for displaying the cost of electrical energy consumption in monetary indicia, the display being driven through some appropriate display driver 432 controlled by the 3850 CPU. Also visible on the front of the monitor are three lights 434, 436 and 438 representing peak power, partial peak power and off peak power periods. Obviously the off peak indicator is on only when both of the other indicators are off. During peak power periods, indicator 434 will be on, the cost of the energy being consumed will be based on the peak power charge rate, and the kilowatt-hours being consumed will be accumulated both on the total accumulator 420 and on the peak kilowatt-hour accumulator 422. Similarly, during the partial peak power periods indicator 436 will be on, the cost of energy being consumed will be accumulated at the applicable partial peak rate, and the kilowatt-hours being consumed will be accumulated both on the total kilowatt-hour accumulator 420 and the partial peak kilowatt-hour accumulator 424. As shall subsequently be seen, the information provided by the accumulators 420, 422, and 424 is also accumulated in memory.

At the side of the energy cost monitor of FIG. 11 is an opening 440 for receiving a card 442. Within the monitor is a printer 444 controlled by conventional printer control 446, and a magnetic card reader (and writer) 448 controlled by card read/write electronics 450. In the preferred form of this embodiment the printer uses a twelve digit thermoprint head manufactured by Toyo Electronics of Tokyo, Japan as their model number KH40, and the card reader is a model number SANAC MCP 400 manufactured by Sankyo Seiki Manufacturing Co. of Tokyo, Japan. As the card 442 is inserted into the opening 440, it first passes under the print head and then into the reader, wherein it is retained until ejected at the end of the billing period. With this arrangement one line of numbers may be written on the card by the print head prior to the ejection of the card by the reader, with a second line being printable after the ejection (actually partial ejection) of the card so that two twelve digit lines may be written by the single line printer. As will subsequently be described, considerable machine readable data is written ("printed") on the card during ejection, so that when mailed to the utility billing office it can be automatically processed. In that regard, the word "print" as used herein and in the claims is used in the most general sense to include all forms of recording, whether by depositing print, change in color of the medium (thermal printer), magnetic recording, punching, etc.

Before presenting the program for the electrical energy monitor portion of the device of FIG. 11 as shown in the block diagram of FIG. 10, it is first instructive to consider the preferred organization and function of the card 442 (FIG. 11) as it relates to the electrical energy cost monitor. The preferred form of card is a magnetic card wherein digital data may be stored for reading (and writing) by a mag card reader (e.g. machine readable storage medium). Also, as previously mentioned, in this embodiment a printer for printing out man readable charge information is also included, printing just before card ejection and at the end of ejection, thereby printing the numeric charge information on suitable regions at each end of the mag card provided for this purpose.

The complete cycle of operation of this embodiment is as follows. For each billing period a card is prepared in advance for each subscriber and mailed to the subscriber, preferably early in the billing period immediately preceeding the billing period for which the data on the card is intended for use. A typical card format, and the format which the program listing hereinafter presented utilizes, is presented below (this information of course being stored on the card in magnetic form).

the base charge, i.e. the monthly (or other billing cycle) fixed charge irrespective of consumption. The following four lines 6 through 9 identify the normal charge rate, i.e. the rate per kilowatt-hour (or the equivalent thereof) which will be charged unless a peak rate or partial peak rate is being charged. Lines 10 through 13 identify the partial peak rate, with lines 14 through 17 identifying the peak rate to be charged. Lines 18 through 20 allow the identification of up to three holi-

| BYTE# | DESCRIPTION | | | DIBUFC | |
|---|---|---|---|---|---|
| 1 | MONTH | | | NOT | TRANSFERRED |
| 2 | I. D. NUMBER | L. S. BYTE | | " | " |
| 3 | " " | M. S. BYTE | | " | " |
| 4 | BASE CHARGE | L. S. BYTE | | DIBUFC | |
| 5 | " " | M. S. BYTE | | " | +1 |
| 6 | NORMAL RATE | L. S. BYTE | | " | +2 |
| 7 | " " | L. M. BYTE | | " | +3 |
| 8 | " " | H. M. BYTE | | " | +4 |
| 9 | " " | M. S. BYTE | | " | +5 |
| 10 | P. P. RATE | L. S. BYTE | | " | +6 |
| 11 | " " | L. M. BYTE | | " | +7 |
| 12 | " " | H. M. BYTE | | " | +8 |
| 13 | " " | M. S. BYTE | | " | +9 |
| 14 | PK RATE | L. S. BYTE | | " | +10 |
| 15 | " " | L. M. BYTE | | " | +11 |
| 16 | " " | H. M. BYTE | | " | +12 |
| 17 | " " | M. S. BYTE | | " | +13 |
| 18 | HOLIDAY 1 | | | " | +14 |
| 19 | " 2 | | | " | +15 |
| 20 | " 3 | | | " | +16 |
| 21 | SAT. P. P. START TIME | | | " | +17 |
| 22 | " " STOP TIME | | | " | +18 |
| 23 | M-F PK. START TIME | | | " | +19 |
| 24 | " " STOP TIME | | | " | +20 |
| 25 | M-F P. P. START TIME | | | " | +21 |
| 26 | " " STOP TIME | | | " | +22 |
| 27 | SAMPLE TIME | | | " | +23 |
| 28 | SAMPLE DATE | | | " | +24 |
| 29 | ENERGY BUDGET | | | " | +25 |
| 30 | EST. LOAD #1 | | | " | +26 |
| 31 | EST. LOAD #2 | | | " | +27 |
| 32 | EST. LOAD #3 | | | " | +28 |
| 33 | EST. LOAD #4 | | | " | +29 |
| 34 | EST. LOAD #5 | | | " | +30 |
| 35 | CHECKSUM | | | NOT | TRANSFERRED |

As may be seen from the listing presented, the first three lines on the card provide basic identification information, the first line identifying the month and the second and third lines presenting the least significant and most significant bits respectively for the subscriber identification number. The device is programed to check the month and the identification number so that if an incorrect card is inserted by the subscriber, either because it is not that subscriber's card or is for the wrong month, the card will be immediately ejected without reading into the system the remaining data on the card. The fourth and fifth line of the card identify days in the billing period (month), line 21 and 22 identify the Saturday partial peak start time and stop times respectively, lines 23 and 24 identify the Monday through Friday peak start and stop times respectively, and lines 25 and 26 identify the Monday through Friday partial peak start and stop times respectively.

The device is programmed so that a designated peak rate period will prevail over a corresponding partial peak rate. Thus, by way of example, if the Monday through Friday partial peak period starts at 2:00 P.M. and ends at 5:00 P.M., the partial peak rate will be applied each day, Monday through Friday, except for designated holidays, during the hours of 2:00 to 5:00 P.M. However, if the Monday through Friday peak rate time is designated as 3:30 to 4:30, then partial peak rate will be applied from 2:00 to 3:30, peak rate will be applied from 3:30 to 4:30, and partial peak rate will be applied from 4:30 to 5:00, with the normal rate (lines 6 through 9) being applied for all other hours of the day. For Saturdays on the other hand, no peak rate is specified, though a partial peak rate will be designated with any desired start and stop time. The rate applied for Sundays and holidays is the normal rate throughout the day. Obviously, however, this assignment may be varied as desired with reprogramming of the device, though is well calculated to allow the assessment of a higher charge for energy consumed during peak and partial peak hours, as energy consumed during those times is actually more expensive to produce because of the necessary but relatively little used generating and distribution equipment required to meet those peak demands. Note also, that since each card contains or may contain information specifically tailored to each subscriber, the application of peak and partial peak rate could be staggered between subscribers or readily varied with time in accordance with generating and distribution cost trends, subscriber response to the peak and partial peak billing scheme, etc.

Lines 27 and 28 are unique to the present invention, in that they allow the identification of a specific 15 minute sample time at any time within the billing period. The system isolates the energy consumption for the identified sample time and prints out that information (actually in machine readable form) on the card in the output phase so that the utility may automatically gather a great deal of statistical data with respect to the energy use at the various times of the day for different types of subscribers, etc.

Lines 29 through 34 allow the designation of an energy budget and estimated average consumption for five individual electrical loads. The energy budget in this embodiment is a designated maximum energy consumption during any fifteen minute period which will be allowed during the designated peak hour periods (e.g. Monday through Friday only). As shown in FIG. 10, a load interrupt control 412 controls five individual loads such as, by way of example, an electric water heater, an air conditioner, a refrigerator, etc., with the average energy consumption for each of these loads being estimated in lines 30 through 34. If the energy consumed during any fifteen minute period of the designated peak rate time exceeds the budget, the system automatically sheds as many of the five loads as will be required to bring the energy consumption within the energy budget for the next 15 minute period, assuming other loads will not change. If the consumption only slightly exceeded the budget, perhaps the shedding of load one would be sufficient, though in other instances loads one and two might have to be shed, or in the maximum all five loads shed. If in the next fifteen minute period the energy consumption is well below budget so that one or more loads may be restored, only one load will in fact be restored by the system, with one additional load being returned in every fifteen minute period so long as the consumption does or will remain with the budget, until all loads are returned. In this manner, consumption during peak hours may be automatically limited by the utility, though management of the alloted consumption is left to the subscriber.

The final line of the card with respect to the input data is a check sum commonly used in digital equipment for error detection.

When the card is received by the subscriber, it is inserted into the cost monitor whereupon the month and identification number is checked, data is read into temporary storage and the check sum is checked. If the check sum is okay, data is then loaded for use, not for the billing period then in progress, but for the next billing period coming up. At the time an individual card is inserted into the monitor, the monitor is then operating using the rate structure and holiday designation loaded by the previous card. A card once inserted and read is retained by the reader until the end of that current billing month, at which time the card will be automatically ejected, having printed thereon in man readable form the billing information for the billing period just completed, with corresponding information being printed in machine readable code. If by chance a subscriber fails to insert the card during any given billing period so that the updated rate information and holiday schedule is not available at the beginning of the next billing period, the system continues with the old billing structure, disregarding all holidays.

The specific machine readable output format for this embodiment is presented below:

| BYTE# | DESCRIPTION | CMOS RAM |
|---|---|---|
| FILE FOR CURRENT MONTH | | |
| 1 | C. M. # - L. S. | 405 |
| 2 | " " " MID | 406 |
| 3 | " " " M. S. | 407 |
| 4 | " " TOTAL KWH L. S. | 408 |
| 5 | " " " " M. S. | 409 |
| 6 | " " PARTIAL PK KWH L. S. | 40A |
| 7 | " " " " " M. S. | 40B |
| 8 | " " PEAK KWH L. S. | 40C |
| 9 | " " " " M. S. | 40D |
| FILE FOR LAST MONTH | | |
| 10 | C. M. # - L. S. | 40E |
| 11 | " " " MID | 40F |
| 12 | " " " M. S. | 410 |
| 13 | " " TOTAL KWH L. S. | 411 |
| 14 | " " " " M. S. | 412 |
| 15 | " " PARTIAL PK KWH L. S. | 413 |
| 16 | " " " " " M. S. | 414 |
| 17 | " " PEAK KWH L. S. | 415 |
| 18 | " " " " M. S. | 416 |
| FILE FOR OLD MONTH | | |
| 19 | C. M. # - L. S. | 417 |
| 20 | " " " MID | 418 |
| 21 | " " " M. S. | 419 |
| 22 | " " TOTAL KWH L. S. | 41A |
| 23 | " " " " M. S. | 41B |
| 24 | " " PARTIAL PK KWH L. S. | 41C |
| 25 | " " " " " M. S. | 41D |
| 26 | " " PEAK KWH L. S. | 41E |
| 27 | " " " " M. S. | 41F |
| MISC. INFORMATION | | |
| 28 | SAMPLE | 420 |
| 29 | TFLAG | 421 |
| 30 | ACTUAL DATE OF BILLING | 422 |
| 31 | MONTH OF BILLING | 423 |
| 32 | CUSTOMER I. D. # L. S. | 424 |
| 33 | " " " M. S. | 425 |
| 34 | SPARE | 426 |
| 35 | SPARE | 427 |
| 36 | SPARE | 428 |
| 37 | CHECKSUM | 429 |

At the end of each billing period the data for that billing period is printed out on the card and also stored in an audit trail file, with each month's information stored therein being moved down one month at the same time. Accordingly an audit trail is maintained directly in memory as well as in the electro-mechanical counters so that the audit trail may also be printed out each month. In particular, it will be noted that lines 1 through 9 of the machine readable print out provide the file for the current month, that is, for the billing period just completed, providing the current monthly charge in dollars in lines 1 through 3, the total kilowatt-hours in lines 4 and 5, the partial peak kilowatt-hours in lines 6 and 7, and the peak kilowatt-hours in lines 8 and 9, lines 4 through 9 effectively reproducing on the card the same information that is available on a running total rather than on a monthly basis in the electro-mechanical counters 420, 422 and 424 (see FIG. 10). Lines 10 through 18 of the output format provide the file for the previous month, with lines 19 through 27 providing the file for the month immediately therebefore, thereby providing a three month audit trail in the readout. Thus, it may be seen that if in any one month the card for that month is not inserted, the next month billing will be determined using the rate structure previously entered and disregarding all holidays, with a print out in machine readable form providing the audit trail so that one month's billing is not lost by the failure to insert one month's card. Also the use of a twelve digit printer printing at both ends of the card provides ample man readable print out of the billing information for the current month so that the bill is immediately presented to the subscriber for the current month, including the partial peak, peak and total kilowatt-hours, and the monetary charge, so that the card, with payment enclosed, may be returned to the utility.

Lines 28 through 36 are available for miscellaneous information, including the date of the billing, the month of the billing, customer identification, etc., with line 28 providing the energy consumption for the fifteen minute sample period identified on the corresponding input card. As before, line 37 provides the check sum. (note that, by way of example, a card mailed to a subscriber and entered into the monitor in May will carry the June rate structure, being ejected at midnight at the end of May with the May billing information thereon. Accordingly, in general, the rate structure on a particular card is not the one on which the billing information printed thereon will be based, but instead is the billing information for the immediately following billing period.

A specific program for accomplishing the functions hereinbefore described for a system in accordance with the diagram of FIG. 10 is as follows:

```
RAM     EQU   H'400'
FLAGS   EQU   RAM
LCTL    EQU   RAM+1
DOLLAR  EQU   RAM+2
CURRNT  EQU   RAM+5
TKWH    EQU   RAM+8
PPKWH   EQU   TKWH+2
PKWH    EQU   PPKWH+2
LASTMO  EQU   PKWH+2
EARMO   EQU   LASTMO+9
SAMPL   EQU   EARMO+9
TFLAG   EQU   SAMPL+1
ODATE   EQU   TFLAG+1
OMONTH  EQU   ODATE+1
OIDNO   EQU   OMONTH+1
OCKSUM  EQU   RAM+41
TWHBKT  EQU   RAM+44
DIBUFA  EQU   RAM+50
DIBUFB  EQU   DIBUFA+NWORDS+5
DIBUFC  EQU   DIBUFB+BUFSIZ
BASCHG  EQU   DIBUFC
NRATE   EQU   DIBUFC+2
PPRATE  EQU   NRATE+4
PKRATE  EQU   PPRATE+4
HOL1    EQU   DIBUFC+14
MFPPSR  EQU   HOL1+NHOLID+4
STIME   EQU   MFPPSR+2
EBUDGT  EQU   STIME+2
TEMP    EQU   0
TEMP1   EQU   1
KWORD   EQU   1
MONTH   EQU   2
TEMP2   EQU   2
KWORD2  EQU   2
TEMP3   EQU   3
ODD     EQU   3
KBITS   EQU   3
DIGIT   EQU   3
```

```
KOUNT   EQU   3
RATECX  EQU   4
KRDYLO  EQU   4
KRDYHI  EQU   5
TEMP5   EQU   5
ECNTR   EQU   6
RATECL  EQU   7
ESMPL   EQU   8
KDELAY  EQU   9
DATE    EQU   10
TIME    EQU   11
SENSE   EQU   0
CTLPRT  EQU   0
RSENSE  EQU   0
RDYRST  EQU   0
DISPRT  EQU   1
MAGPRT  EQU   1
LDPRT   EQU   4
SSENSE  EQU   4
CLOCK   EQU   5
IPORT1  EQU   6              3861/3851 INT.CONTROL PORT
IPORT3  EQU   H'0E'          3853 INTRP CONTROL PORT
LOIPRT  EQU   H'0D'          3853 INTRP VECTOR PORT
HIIPRT  EQU   H'0C'
FACTOR  EQU   28             EBUDGET MULT
DISDLY  EQU   6              SETS DISP.SCAN RATE (100/SEC)
PRTDLY  EQU   168            SET FOR PRTR.DLY.(35MS/CHAR)
PRT1EN  EQU   H'0C'
PRT2EN  EQU   H'0D'
MCPRES  EQU   B'00100000'
MCLOAD  EQU   B'00010000'
MWDLAY  EQU   H'0A'          DLY.CONSTANT FOR MAG WRT
SSMASK  EQU   B'00111111'    TO REMOVE SAT/SUN BITS
RSTWRD  EQU   9
NWORDS  EQU   35
BUFSIZ  EQU   NWORDS-3
NHOLID  EQU   3              4 FOR 60-DAY BILLING
EJTWRD  EQU   H'0B'
WRENAB  EQU   H'0A'          MAG CARD WRT ENABLE
MSIZE   EQU   9              SIZE OF MONTH FILE
BKTSIZ  EQU   6
OUTDHI  EQU   1
OUTDLO  EQU   OUTDIS-RESET-H'100'  IF OUTDIS ON PAGE 1
IADLO   EQU   TIMCHK-RESET   IF TIMCHK ON PAGE 0
*
* PWR.START OR MANUAL RESET HERE
*
        ORG   0
RESET   DI                   DISABLE INT
        LI    H'1F'          SHED ALL INT.
        OUTS  LDPRT          LOADS UNTIL TIMCHK
        LIS   0
        OUTS  CLOCK          CLEAR CLOCK PORT
        OUTS  CTLPRT         CLR CONTROL PORT
        OUTS  HIIPRT         SET HIGH INTRPT ADDR
        LR    ECNTR,A
        LR    ESMPL,A
        DCI   FLAGS
        LISU  7
        LISL  7
RSLOOP  LM                   GET RAM BYTE
        LR    D,A            PUT IN SCR
        BR7   RSLOOP
        LI    IADLO
        OUTS  LOIPRT
        LIS   1
        OUTS  IPORT3
        OUTS  IPORT1
        LISU  6
        LR    S,A            BILOUT RETN FLAG = 1
        OUTS  CTLPRT         SET CCTL FOR DATE BYTE
        DCI   ODATE
        LM                   GET ODATE
```

```
                COM
                INC
                LR      TEMP,A          TEMP=-ODATE
        CRDYCK  INS     SSENSE
                NI      B'00100000'
                BNZ     CRDYCK          WAIT FOR CLOCK RDY
                INS     CLOCK           DATE BYTE
                NI      SSMASK          STRIP OFF SAT/SUN BITS
                LR      DATE,A          STORE CURR.DATE
                AS      TEMP            DATE-ODATE
                BP      GTIMCK          DATE >= ODATE
        NEWMON  LR      Q,DC            SAVE OMONTH ADD
                LM                      OMONTH
                INC
                CI      12
                BP      N1
                LIS     1
        N1      LR      DC,Q            OMONTH ADDR.
                ST
                JMP     BILOUT          GO PERFORM BILLING
        GTIMCK  DS      DATE
                BNZ     G1              DATE NOT 1ST
                LIS     0
                OUTS    CTLPRT          SET CCTL FOR TIME
                INS     CLOCK           GET TIME BYTE
                BNZ     G1              NOT MIDNIGHT
                LIS     1
                LR      TIME,A          SET UP TIME OF 12:15AM
                JMP     TIMCHK+4
        G1      JMP     TIMCHK
        * 3861 INT GOES HERE FOR UPDATE
                ORG     H'A0'
        UPDATE  DCI     DOLLAR
                COM                     CLR CARRY
                LISL    5
        ULOOP   LISU    6               FOR RATE
                LM                      GET RAM $BYTE
                LNK                     ADD IN CARRY
                LR      TEMP,A
                LR      A,S             GET RATE BYTE
                AI      H'66'
                ASD     TEMP
                LISU    7               FOR SCR.$ REG.
                LR      D,A             STORE SUM IN SCR$,DECR.ISAR
                BR7     ULOOP
        PWRCHK  INS     RSENSE
                SL      1
                DCI     FLAGS
        ULOOP2  LR      A,D
                ST
                BR7     ULOOP2
                JMP     BUCKET          INCR.PROPER BUCKET
        *TIME INT GOES HERE SIGNALING A NEW TIME
        TIMCHK  LISU    7
                LISL    6               LCTL
                LIS     0
                OUTS    CTLPRT
                INS     CLOCK           GET TIME BYTE
                LR      TIME,A
                LIS     1
                OUTS    CTLPRT          SET CCTL BIT FOR DATE
                INS     CLOCK           DATE BYTE
                NI      SSMASK          STRIP OFF SAT/SUN BITS
                LR      DATE,A
                DCI     ODATE
                ST
        DAYCHK  LIS     NHOLID          # HOLIDAYS
                LR      KOUNT,A
                INS     CLOCK           DATE BYTE WITH SAT/SUN
                BM      NORMAL            SUNDAY
        HOLCHK  DCI     HOL1
        HLOOP   CM                      COMP DATE WITH HOLIDAY
                BZ      NORMAL
```

```
          DS    KOUNT
          BNZ   HLOOP
          SL    1
          BM    SAT           SATURDAY
          LR    A,TIME
          CM                  SKIP SAT.LIMITS
          CM
          INC                 T'=T+15 MIN
          CM                  COMP T' WITH PK START
          BP    PPCHK         BEFORE PEAK START
          CM                  STOP-T'
          BM    PPCHK
*
* PEAK HOUR TIME
*
PEAK      DCI   EBUDGT
          LIS   5
          LR    KOUNT,A
          LR    A,ESMPL
PLOOP     AM                  1ST PASS ADDS EBUDGT
          BP    ENOUGH
          LR    TEMP,A
          LR    A,S           LCTL=
          SL    1               2*LCTL + 1
          INC                 (SHED NEXT  LD)
          NI    B'00011111'   5 LOADS MAX
          LR    S,A
          DS    KOUNT
          LR    A,TEMP
          BNZ   PLOOP
PFINSH    LIS   2
          BR    TIMSET
ENOUGH    LR    A,KOUNT
          CI    5             1ST PASS?
          BNZ   PFINSH        NO
          LR    A,S           LCTL=
          SR    1               LCTL / 2
          LR    S,A           (RESTORE LAST LOAD)
          BR    PFINSH
PPCHK     DCI.  MFPPSR        PP START
          CM                  COMP T WITH M-F PP START
          BP    NORMAL        BEFORE PP START
          CM                  COMP T WITH MF PP STOP
          BM    NORMAL        BEYOND PP STOP
*
* PARTIAL PEAK TIME
*
PPEAK     LIS   1
          BR    TIMSET
SAT       LR    A,TIME
          INC                 T'=T+15 MIN.
          CM                  COMP T' WITH SAT PP START
          BP    NORMAL        BEFORE PP START
          CM                  COMP T' WITH PP STOP
          BP    PPEAK         BEFORE PP STOP
* NORMAL TIME-NOT PEAK OR PARTIAL PEAK
NORMAL    LIS   0
* SET UP COND.AS PER TIME CLASS
TIMSET    LR    RATECL,A
          CI    2             PEAK TIME?
          BZ    LDSET         YES
          LIS   0
          LR    S,A           SET LCTL=0
LDSET     LR    A,S           GET LCTL
          OUTS  LDPRT
* SET UP PROPER RATE FACTOR
RATSET    DCI   NRATE
          LR    A,RATECL
          SL    1             RATECL*2
          SL    1             RATECL*4
          ADC                 DC0=NRATE + 4*RATECL
          LIS   4             THERE ARE 4 BYTES PER RATE
          LR    KOUNT,A
```

```
           LISU   6
           LISL   5
RLOOP      LM
           LR     D,A              ISAR DECR.
           DS     KOUNT
           BNZ    RLOOP            MORE TO DO
           LIS    0
           LR     D,A              SET O'61' TO 0
           LR     D,A              SET O'60' TO 0,ISAR=O'67'
           LR     S,A              BILOUT RETN FLAG = 0
           LISU   7                ISAR O'77'
FLGSET     LR     A,S              GET FLAGS FROM O'77'
           NI     B'11111000'      CLR 3 LS BITS
           AS     RATECL
           LR     D,A              PUT FLAGS IN FLAGS 77;ISAR TO 76
           LR     A,I              GET LCTL TO SEE IF ANY LOADS OFF
           SL     1
           BZ     SAMCHK           NO LOADS INT.
           LIS    4                BIT 2 OF CTLPRT FOR APPL.OFF
           AS     S                ADD IN RATECL FLAGS
           LR     S,A              DEP.COMB.FLAGS IN O'77'
SAMCHK     DCI    STIME
           LR     A,TIME
           CM                      COMP T WITH SMPL T
           BNZ    EOMCHK           NOT SMPL TIME
           LR     A,DATE           DATE BYTE WITHOUT SAT/SUN
           CM                      COMPARE WITH SDATE
           BNZ    EOMCHK           NOT SDATE
           DCI    SAMPL
           LR     A,ESMPL
           COM
           INC                     SAMPL=-ESMPL
           ST
EOMCHK     LIS    0
           LR     ESMPL,A          RESET ESMPL
           AS     TIME
           BNZ    SCAN             NOT END OF MONTH
           LR     A,DATE           DATE BYTE WITHOUT SAT/SUN
           SR     1                ANY DATE > 1ST WILL YIELD
           BNZ    SCAN             NON-ZERO INDICATING NOT 1ST
           DCI    OMONTH
           LR     Q,DC             SAVE OMONTH ADDR
           LM                      GET OMONTH
           INC
           CI     12
           BP     EOM1
           LIS    1
EOM1       LR     DC,Q             GET OMONTH ADDR.
           ST                      UPDATE OMONTH
           JMP    BILOUT           GO DO BILLING
SCAN       EI                      ENABLE INT
           LIS    DISDLY
           LR     KDELAY,A         SET KDELAY FOR DISP.MODE
SCAN1      LIS    7
           LR     DIGIT,A          DIGIT=7
           LR     K,P
           LISU   7
           LISL   2                SET UP ISAR FOR LS DISP.BYTE
DBYTE      LR     A,S
           SL     4
           LR     TEMP5,A
           PI     OUTDIS           DISPL.L.S.NIB.
           LR     A,D
           SR     4
           SL     4                GET MS NIB.CLEAN
           LR     TEMP5,A
           PI     OUTDIS           DISPL.M.S.NIB.
           BC     DBYTE            GET ANOTHER UNLESS DIGIT 0
           LIS    0
           OUTS   DISPRT           CLEARS DISP.
           OUTS   CTLPRT           CLEARS CTLPRT
           INS    SSENSE           ANY AUX SWITCHES DOWN?
           DI                      DISABLE INT
```

```
           BM    DATAIN             GO READ MAG CARD
           LR    A,KDELAY
           CI    PRTDLY             DISP.OR PRINT?
           BNZ   SCAN                NOT PRINT,ASSUME DISP.
           PK                       NON DISP
OUTDIS     LR    A,TEMP5
           AS    DIGIT              COMBINE DATA & DIGIT
           OUTS  DISPRT             OUT TO DISP.
DELAY      LR    A,KDELAY
           LR    TEMP,A
D1         LI    246                SETS RES.& MAX DELAY
D2         INC
           BNC   D2                 NOT FULL
           DS    TEMP
           BNZ   D1
           DS    DIGIT
           POP                      RETN
DATAIN     LI    NWORDS
           LR    KWORD,A
           LR    KWORD2,A
           DCI   DIBUFA
           LR    Q,DC               SAVE DIBUFA ADDR
           LI    B'11111110'
           OUTS  MAGPRT
GETBYT     LIS   8
           LR    KBITS,A
           LIS   0
GETBIT     SL    1
           LR    TEMP,A
           PI    SNSRDY             RST RDY,LOOK FOR SET
           INS   MAGPRT
           COM                      FE=1,FF=0
           AS    TEMP
           DS    KBITS
           BNZ   GETBIT             WORD NOT COMPLETE
           ST                       WORD COMPLETE,STORE IT
           DS    KWORD
           BNZ   GETBYT             GO GET ANOTHER BYTE
CKSUM      LR    DC,Q               DC0=DIBUFA
           DS    KWORD2
           LIS   0
CKSUM1     AM
           DS    KWORD2
           BNZ   CKSUM1
           CM                       CMPARE W INPT CKSUM WORD
           BZ    CKINTP             READ O.K
BADRD      LIS   EJTWRD
           OUTS  CTLPRT              EJ.CARD
FINISH     JMP   SCAN
CKINTP     LIS   3
           LR    KOUNT,A
           DCI   OMONTH             GET ADDR OF MONTH IN MEM
           XDC
           LR    DC,Q               DC0=IMONTH;DC1=OMONTH
C1         DS    KOUNT
           BNC   TRSFAB             KOUNT DECR FROM ZERO- ALL O.K.
           LM
           XDC                      DC0=O;DC1=I
           CM
           XDC                      DC0=I;DC1=O
           BZ    C1                 BYTES ARE RIGHT
           BR    BADRD
TRSFAB     XDC                      DC1=SOURCE
           DCI   DIBUFB             DC0=DEST,DC1=SOURCE
           LI    NWORDS
           LR    KWORD,A
TRCALL     PI    TRANSF
           LI    PRTDLY+1
           LR    KDELAY,A
           JMP   SCAN1
TRANSF     XDC                      DC0=SOURCE;DC1=DEST
```

```
TRANS2   LM
         XDC                   DC0=DEST;DC1=SOURCE
         ST
         DS      KWORD
         BNZ     TRANSF        MORE TO BE TRANSF.
         POP
BUCKET   LR      A,RATECL      GET RATE CLASS SET IN TIMCHK
         LR      RATECX,A      PUT IN SPECIAL CELL FOR
         DS      ECNTR
         BP      WHPLUS
         LI      FACTOR-1
         LR      ECNTR,A       RESTORE FACTOR IN CNTR
         DS      ESMPL         1 NEG.CNT IN ESMPL
         BM      WHPLUS        NO OVERFLOW AS LONG AS NEG
         LI      -128          MAX.ALLOWED CNT
         LR      ESMPL,A
WHPLUS   LI      H'66'
         LR      TEMP,A        STORE H'66'
         DCI     TWHBKT
         LR      A,RATECX
         SL      1
         ADC                   DC0=TWHBKT+2*RATECX
         LR      Q,DC          SAVE DC0
         XDC
         LR      DC,Q          DC0=DC1=WHBKT
         LM                    GET L.S.BYTE
         AI      H'36'         ADD 3.6WH/PASS
         ASD     TEMP          ADD IN H'66'
         XDC                   DC0=L.S.BYTE
         ST
         XDC                   DC0=M.S.BYTE
         LM
         LNK                   ADD IN CARRY
         ASD     TEMP          ADD IN H'66'
         XDC                   DC0=M.S.BYTE
         ST
         BNC     BFINSH        N.C.FROM WHBKT
PULSE    LIS     6
         AS      RATECX
         OUTS    CTLPRT
         LI      TKWH-TWHBKT-2
         ADC                   DC0=STRT OF KWHBKT
         LR      Q,DC
         XDC
         LR      DC,Q          DC0=DC1=KWHBKT
         LM                    GET L.S.BYTE
         INC
         ASD     TEMP          ADD IN H'66'
         XDC
         ST
         XDC
         LM                    GET M.S.BYTE
         LNK                   ADD CARRY
         ASD     TEMP
         XDC
         ST
BFINSH   DS      RATECX
         BNC     GOSCAN        RATECX 0 SO ALL THROUGH
         LIS     0
         LR      RATECX,A      RATECX MADE ZERO
         BR      WHPLUS
GOSCAN   JMP     SCAN          RESUME SCAN
BILOUT   DCI     HOL1
         LIS     NHOLID
         LR      TEMP,A
         INS     SENSE
         NI      MCLOAD
         BZ      MOVES         NO MAG CARD PRESENT
         LI      PRTDLY
         LR      KDELAY,A
         LIS     PRT1EN        PRINT ENABLE GRP1
```

```
        OUTS    CTLPRT
        PI      SCAN1           PRINT $
        PI      MAGWRT
        LIS     15              FOR 800MS DLY.
        LR      DIGIT,A
WLOOP   LIS     0
        LR      TEMP,A
        PI      DELAY+2
        BNZ     WLOOP
        DCI     TKWH
        LISU    7
        LISL    2               O'72' LS SCAN REG.
MOR1    LM
        LR      D,A
        BR7     MOR1
        PI      SCAN1           PRINT GRP.1
        LISL    2
MOR2    LM
        LR      D,A
        BR7     MOR2
        LIS     PRT2EN
        OUTS    CTLPRT          ENABLE GRP.2 PRINT
        PI      SCAN1           PRINT GRP2
MOVES   DCI     DIBUFC          DC0=DEST.ADDR.
        XDC                     DC1=DEST
        DCI     DIBUFB          DC0=SOURCE
        LI      NWORDS-4
        LR      KWORD,A         SET UP WRD CNT
        PI      TRANS2          TRANSF.DIBUFB TO DIBUFC
        DCI     EARMO           DEST
        XDC
        DCI     LASTMO          SOURCE
        LR      Q,DC            SAVE LAST MONTH ADDR
        LIS     MSIZE
        LR      KWORD,A         SET WORD COUNT
        PI      TRANS2          TRANSF.LASTMO TO EARMO
        LR      DC,Q            DC0=LAST MONTH ADDR.
        XDC                     DC1=DEST
        DCI     CURRNT          DC0=SOURCE
        LR      Q,DC            SAVE ADDR.OF CURRNT
        LIS     MSIZE
        LR      KWORD,A         SET UP WRD CNT
        PI      TRANS2
        LR      DC,Q            DC0=CURRNT-DEST
        LIS     H'0F'
        NM
        LR      DC,Q            DC0=CURRNT
        ST                      SAVES L.S.NIB.;ZEROES M.S.NIB.
        XDC                     DC1=CURRNT+1=DEST.
        DCI     BASCHG          DC0=BASCHG=SOURCE
        LIS     2
        LR      KWORD,A         SET UP WORDCOUNT
        PI      TRANS2          TRANSF.BASE CHG
        LIS     BKTSIZ
        LR      KOUNT,A
        LIS     0
CLRBKT  ST                      ZEROES ALL KWHBKTS
        DS      KOUNT
        BNZ     CLRBKT          MORE
        LISU    6
        LISL    7
        DS      S
        BNC     GSCAN           N.C.MEANS FLAG=0 FROM TIMCHK
        JMP     GTIMCK
GSCAN   JMP     SCAN
MAGWRT  DCI     CURRNT
        LR      K,P             SAVE PC1 FOR PK RETN
        LR      Q,DC            SAVE CURRNT ADDR.
        LI      OCKSUM-CURRNT+2
        LR      KWORD2,A        # WORDS OUTPUT
        LI      OCKSUM-CURRNT
```

```
        LR    KWORD,A
        LIS   WRENAB       WRT ENABLE WORD
        OUTS  CTLPRT
        LIS   0
        OUTS  MAGPRT
WCKSUM  AM
        DS    KWORD
        BNZ   WCKSUM
        ST                 DEP.CHECKSUM IN OCKSUM
        LR    DC,Q         DC0=CURRNT
WBYTE   LIS   8
        LR    KBITS,A
        LM                 WORD FROM MEM.
        LR    TEMP,A       SAVE IT IN TEMP
WBIT    PI    SNSRDY       RST RDY;WAIT FOR SET
        LIS   RSTWRD
        OUTS  CTLPRT
        LI    227          FOR DLY.
W1      INC
        BNZ   W1
        LR    A,TEMP       GET WORD FROM TEMP
        OUTS  MAGPRT
        SL    1            MOVE OVER FOR 2ND BIT
        LR    TEMP,A
        LI    245
W2      INC
        BNZ   W2
        DS    KBITS
        BNZ   WBIT         WORD NOT COMPLETE
        DS    KWORD2
        BNZ   WBYTE        MORE WORDS TO BE OUTPUT
        PK                 GO BACK TO CALLING PGM
SNSRDY  LIS   RSTWRD
        OUTS  CTLPRT       RESET RDY FF
        LIS   0
        OUTS  CTLPRT
CKRDY   INS   SENSE
        BP    CKRDY
        POP                RETN TO PGM
        END
```

In the preferred form of this embodiment, only the electrical cost monitor shown in block diagram of FIG. 10 and in the upper portion of the energy cost monitor of FIG. 11 is used, though as an alternate the additional gas monitor included in FIG. 11 may also be used. In this form the gas monitor is similar to at least one embodiment of the electrical monitor in that break points in the consumption of the gas may be incorporated, whereby subscribers are charged at progressively increasing rates as gas consumption for a particular billing period increases. Thus the input information for a gas monitor would include a base charge, if any, and a series of rates and break points identifying the ranges of billing period consumption for which each rate will be applied. Thus, in FIG. 11, by way of example, the charge for the billing period is displayed on display 452, with an indication of the rate being applied being provided by a series of lights 454 through 464. Also, as an additional indication of the total consumption with respect to the break points a display 466 may be provided for displaying the number of therms to the next break point. Also in the embodiment shown in FIG. 11, indicators 468 and 470 are provided for indicating when a card should be removed and a new card inserted respectively. Other features which may be advantageously included are various supervisory functions, accessible only by a utility representative at the conventional meter site. Thus, for instance, access under lock and key may be provided to a card out request switch 472 for ejecting the card within the home, such as may be desired when service is discontinued in the middle of a billing period. Also, it is desirable to provide an interconnect accessible to the utility representative so that a supervisory control may be coupled to the system for such purposes as initial setting of the clock, execution of diagnostic programs and the non-destructive readout of current files.

In the gas system, any suitable sensor operative from the conventional meter movement (as with the electrical system) may be used, or a separate flow rate monitor may be provided for this purpose. Further, it should be understood, by way of example, that in all of the foregoing microprocessor based systems, an input signal comprising a parallel reading of the meter dials rather than a rate input may be used, or any combination of rate and amount input signals may be used as an input to the cost monitors indicative of the rate of usage of the utility.

Thus while the present invention has been specifically diclosed and described with respect to certain preferred embodiments, it will be understood by those skilled in the art, that in accordance with the prior discussion, various changes in form and detail may be made therein without departing from the spirit and scope of the invention. It is to be understood further that the word microprocessor as used herein and in the appended claims, except as used specifically with respect to the F8 microprocessor is used in the broad sense to designate digital computational devices generally, whether general purpose or dedicated, and whether programmable, microprogrammable or hardwired, the F8 merely being an example of a general purpose programmable microprocessor.

We claim:

1. A device for monitoring usage of a particular utility and displaying the accumulated usage in a monetary designation comprising;

means for providing an analog signal responsive to the rate of usage of the utility, voltage controlled oscillator means responsive to said analog signal for providing a voltage controlled oscillator means signal having a repetition rate responsive to the rate of usage of the utility, means for providing a cumulative signal responsive to the cumulative repetition of said voltage controlled oscillator means signal, said last named means including means for varying the relationship of said cumulative signal with respect to said cumulative repetition of said voltage controlled oscillator means signal in accordance with a cost per unit of the utility; and means for displaying said cumulative signal in numerical form.

2. The device of claim 1 wherein said means for varying the relationship of said cumulative signal with respect to said cumulative repetition of said voltage controlled oscillator means signal comprises a programmable frequency divider means.

3. The device of claim 1 wherein said means for providing a cumulative signal comprises a calculator chip and means for repetitively causing said chip to execute an add operation responsive to said voltage controlled oscillator means signal.

4. The device of claim 3 wherein said calculator chip has an automatic constant feature, and said means for varying the relationship of said cumulative signal with respect to said cumulative repetition of said voltage controlled oscillator means signal comprises a keyboard coupled to said calculator chip for manually entering said cost per unit of the utility.

5. A device for monitoring usage of a particular utility and displaying the accumulated usage in terms of approximate cost of the utility used comprising:

first means for providing a pulse train having a repetition rate responsive to the rate of usage of the utility;

an electronic numeric display;

a calculator chip coupled to said electronic numeric display, said calculator chip having an automatic constant capability whereby successive summing operations will successively add a predetermined constant to a running total for display in numeric form on said electronic numeric display;

a keyboard coupled to said calculator chip for manually entering said predetermined constant; said means coupled to said first means and said calculator chip for initiating said successive summing operations responsive to said repetition rate of said first means.

6. A device for monitoring usage of a particular utility and displaying the accumulated usage in a monetary designation comprising;

means for providing a first signal having a repetition rate responsive to the rate of usage of the utility;

microprocessor means for providing a second signal responsive to the cumulative repetition of said first signal, said microprocessor means being means for operating under program control, said microprocessor means including program storage means for storing a program, and constants storage means for storing constants for determinging the relationship between said second signal and said first signal;

means for displaying said second signal in numerical form, and printing means and resetting means, said printing means being coupled to said microprocessor means for printing out the previously cumulated charge, said resetting means being a means for resetting the cumulative charge being displayed at the start of each billing period, said printing means and said resetting means being cooperatively operative to print out the previously cumulated charge and to then reset the cumulative charge at the conclusion of one billing period and in start of the next billing period.

7. The device of claim 6 wherein said program storage means is a read only memory means.

8. The device of claim 6 wherein said constants storage means is an electrically alterable storage means.

9. The device of claim 8 further comprised of means for entering constants into said constants storage means.

10. The device of claim 9 wherein said means for entering constants comprises a reader means for reading the information carried by a machine readable data storage device.

11. The device of claim 8 further comprised of a stand-by power means for maintaining the content of said electrically alterable storage means upon the temporary loss of line power.

12. The device of claim 6 wherein said constants storage means is a means for storing a first cost per unit of the utility.

13. The device of claim 12 wherein said constants storage means is also a means for storing a base charge.

14. The device of claim 12 wherein said storage means is also a means for storing a break point and a second cost per unit of the utility for application above the break point.

15. The device of claim 6 further comprised of clock means for providing signals indicative of the end of each billing period, said clock means being coupled to said printing means and said resetting means, said clock means being operative to cause the print out of the cumulative charge at the end of the billing period and to reset the cumulative charge to start the next billing period.

16. The device of claim 15 wherein said clock means is coupled to said printing means and said resetting means through said microprocessor means.

17. The device of claim 16 further comprised of data storage means for storing the cumulative charge at the end of a billing period independent of said reset means, thereby providing a stored audit trail.

18. The device of claim 17 wherein said printing means is also a means for printing out the stored audit trail.

19. The device of claim 6 further comprised of clock means coupled to said microprocessor for providing signals indicative of the time of day, said constants storage means being a means for storing constants representing a first cost per unit of the utility for application during off peak hours and a second cost per unit of the utility for application during peak hours, whereby the relationship of said second signal and the repetition of said first signal may be varied with the time of day.

20. The device of claim 19 wherein said constants storage means is also a means for storing the time of day after which said first and said second cost per unit of the utility will be applied.

21. The device of claim 20 wherein said constants storage means is electrically alterable, and further comprised of a means for entering constants into said constants storage means.

22. The device of claim 21 wherein said means for entering constants comprises a reader means for reading the information carried by a machine readable data storage device.

23. The device of claim 6 further comprised of clock means and control means coupled to said microprocessor means, said clock means being a means for providing signals indicative of the time of day, said control means being a means for shedding predetermined loads based upon time of day.

24. The device of claim 23 wherein said constants storage means is also a means for storing the time of day during which loads may be shed.

25. The device of claim 24 wherein said constants storage means is also a means for storing predetermined limits for the usage of the utility during the respective time of day, and wherein said control means is a means for selectively shedding predetermined loads based also on the overall usage of the utility during the respective time.

26. The device of claim 25 wherein said constants storage means is electrically alterable, and further comprised of a means for entering constants into said constants storage means.

27. The device of claim 26 wherein said means for entering constants comprises a reader means for reading the information carried by a machine readable data storage device.

28. A device for monitoring usage of a particular utility comprising:
first means for providing a first signal indicative of the rate of usage of the utility;
microprocessor means coupled to said first means for providing a second signal responsive to said first signal and indicative of the cumulative charge for the utility, said microprocessor means including constants storage means for storing constants for determining the relationship between said second signal and said first signal, said constants storage means being an electrically alterable storage means;
reader means coupled to said constants storage means for reading constants information carried by a machine readable data storage device into said constants storage means,
printing means and resetting means, said printing means being coupled to said microprocessor means for printing out the previously cumulated charge, said resetting means being a means for resetting the cumulative charge at the start of each billing period, said printing means and said resetting means being cooperatively operative to print out the previously cumulated charge and to then reset the cumulative charge at the conclusion of one billing period and in start of the next billing period, and
clock means for providing signals indicative of the end of each billing period, said clock means being coupled to said printing means and said resetting means, said clock means being operative to cause the print out of the cumulative charge at the end of the billing period and to reset the cumulative charge to start the next billing period.

29. The device of claim 28 wherein said clock means is coupled to said printing means and said resetting means through said microprocessor means.

30. The device of claim 29 further comprised of data storage means for storing the cumulative charge at the end of a billing period independent of said reset means, thereby providing a stored audit trail.

31. The device of claim 30 wherein said printing means is also a means for printing out the stored audit trail.

32. A device for monitoring usage of a particular utility comprising:
first means for providing a first signal indicative of the rate of usage of the utility;
microprocessor means coupled to said first means for providing a second signal responsive to said first signal and indicative of the cumulative charge for the utility, said microprocessor means including constants storage means for storing constants for determining the relationship between said second signal and said first signal, said constants storage means being an electrically alterable storage means;
reader means coupled to said constants storage means for reading constants information carried by a machine readable data storage device into said constants storage means;
printing means and resetting means, said printing means being coupled to said microprocessor means for printing out the previously cumulated charge, said resetting means being a means for resetting the cumulative charge at the start of each billing period, said printing means and said resetting means being cooperatively operative to print out the previously cumulated charge and to then reset the cumulative charge at the conclusion of one billing period and in start of the next billing period, and
clock means coupled to said microprocessor for providing signals indicative of the time of day, said constants storage means being a means for storing constants representing a first cost per unit of the utility for application during off peak hours and a second cost per unit of the utility for application during peak hours, whereby the relationship of said second signal and the repetition of said first signal may be varied with the time of day.

33. The device of claim 32 wherein said constants storage means is also a means for storing the time of day after which said first and said second cost per unit of the utility will be applied.

34. A device for monitoring usage of a particular utility comprising:
first means for providing a first signal indicative of the rate of usage of the utility;
microprocessor means coupled to said first means for providing a second signal responsive to said first signal and indicative of the cumulative charge for the utility, said microprocessor means including constants storage means for storing constants for determining the relationship between said second signal and said first signal, said constants storage means being an electrically alterable storage means;

reader means coupled to said constants storage means for reading constants information carried by a machine readable data storage device into said constants storage means;

printing means and resetting means, said printing means being coupled to said microprocessor means for printing out the previously cumulated charge, said resetting means being a means for resetting the cumulative charge at the start of each billing period, said printing means and said resetting means being cooperatively operative to print out the previously cumulated charge and to then reset the cumulative charge at the conclusion of one billing period and in start of the next billing period, and clock means and control means coupled to said microprocessor means, said clock means being a means for providing signals indicative of the time of day, said control means being a means for shedding predetermined loads based upon time of day.

35. The device of claim 34 wherein said constants storage means is also a means for storing the time of day during which loads may be shed.

36. The device of claim 35 wherein said constants storage means is also a means for storing predetermined limits for the usage of the utility during the respective time of day, and wherein said control means is a means for selectively shedding predetermined loads based also on the overall usage of the utility during the respective time.

37. A method of monitoring usage of a particular utility comprising the steps of:
(a) providing an alterable memory for storing constants to determine the charge for utility usage for different times of day,
(b) providing a reader for reading the constants into the alterable memory from a mailable machine readable storage medium,
(c) providing an electronic computational device to determine the utility charge based upon a signal indicative of the rate of usage of the utility, constants stored in the alterable memory and the time of day,
(d) entering the constants into the alterable memory by insertion of a machine readable storage medium having the constants stored thereon into the reader,
(e) measuring the usage of the utility and providing a signal indicative thereof to the computational device,
(f) computing with the computational device the cummulative charge for the utility usage using the signal produced in step (e) and the applicable stored constants for the respective time of day, and
(g) providing an output representing the cumulative charge for the utility.

38. The method of claim 37 wherein the cumulative charge for the previous billing period is stored during the following billing period, and is also printed at the end of the billing period.

39. The method of claim 37 wherein the constants entered include constants indicative of the allotted utility usage during a certain period of the day, and the method further comprises the step of shedding under control of the computational device predetermined loads during that certain period to stay within the allotted utility usage.

40. The method of claim 37 wherein the machine readable storage medium contains constants for a future billing period, and step (e) comprises the step of entering constants during one billing period for storage and use at a predetermined billing period.

41. The method of claim 40 wherein an identification code is placed on the machine readable storage machine, whereby constants will be read into the alterable memory only by the proper storage medium.

42. A device for monitoring usage of a particular utility comprising:
first means for providing a first signal indicative of the rate of usage of the utility;
microprocessor means coupled to said first means for providing a second signal responsive to said first signal and indicative of the cumulative charge for the utility, said microprocessor means including constants storage means for storing constants for determining the relationship between said second signal and said first signal,
clock means coupled to said microprocessor means for providing signals indicative of the time of day, said constants storage means being a means for storing constants representing a first cost per unit of the utility for application during off peak hours and a second cost per unit for the utility for application during peak hours, whereby the relationship of said second signal with said first signal may be varied with the time of day, and
output means coupled to said microprocessor means for providing an output responsive to said second signal.

43. The device of claim 42 wherein said constants storage means is also a means for storing the time of day after which said first and said second cost per unit of the utility will be applied.

44. The device of claim 42 further comprised of control means coupled to said microprocessor means, said control means being a means for shedding predetermined loads based upon time of day.

45. The device of claim 44 wherein said constants storage means is also a means for storing the time of day during which loads may be shed.

46. The device of claim 45 wherein said constants storage means is also a means for storing predetermined limits for the usage of the utility during the respective time of day, and wherein said control means is a means for selectively shedding predetermined loads based also on the usage of the utility during the respective time.

47. The device of claim 42 wherein said output means comprises means for displaying said second signal in numerical form.

48. The device of claim 42 wherein said output means comprises a printer means for printing a previously cumulated utility charge.

49. The device of claim 42 wherein said constants storage means is an electrically alterable storage means.

50. The device of claim 42 further comprised of means for entering constants into said constants storage means.

51. The device of claim 50 wherein said means for entering constants comprises a reader means for reading the information carried by a machine readable data storage device.

52. The device of claim 42 further comprised of a stand-by power means for maintaining the content of said electrically alterable storage means upon the temporary loss of line power.

53. The device of claim 42 wherein said clock means is also a means for providing signals indicative of the end of each billing period, said clock means being coupled to said microprocessor means, said clock means being operative to cause the recording of the cumulative charge at the end of a billing period.

54. The device of claim 53 further comprised of data storage means for recording the cumulative change at the end of a billing period to provide a stored audit trail.

55. The device of claim 54 further comprised of a printing means for recording the current cumulative charge and the audit trail at the end of a billing period on a separate data storage device.

56. The device of claim 55 wherein said printing means is a means for printing on said separate data storage device in man readable and machine readable form.

57. The device of claim 42 wherein said constants storage means is also a means for storing a base charge.

58. The device of claim 57 wherein said constants storage means is also a means for storing a first cost per unit of the utility, a break point and a second cost per unit of the utility for application above the break point.

59. A device for monitoring usage of a particular utility comprising:
 first means for providing a first signal indicative of the rate of usage of the utility;
 microprocessor means coupled to said first means for providing a second signal responsive to said first signal and indicative of the cumulative charge for the utility, said microprocessor means including constants storage means for storing constants for determining the relationship between said second signal and said first signal, and for storing constants indicative of the allotted utility usage in a particular time period;
 reader means coupled to said constants storage means for reading constants information carried by a machine readable data storage device into said constants storage means;
 clock means and control means coupled to said microprocessor means, said clock means being a means for providing signals indicative of the time of day, said control means being a means for shedding predetermined loads based upon time of day and the allotted utility usage; and
 output means coupled to said microprocessor means for providing an output responsive to said second signal.

60. The device of claim 59 wherein said constants storage means is a means for storing constants representing a first cost per unit of the utility for application during off peak hours, a second cost per unit for the utility for application during peak hours and the time of day of application of said first and second costs, whereby the relationship of said second signal with said first signal may be varied with the time of day.

61. The device of claim 59 wherein said output means comprises means for displaying said second signal in numerical form.

62. The device of claim 59 wherein said output means comprises a printer means for printing a previously cumulated utility charge.

63. The device of claim 59 further comprised of a stand-by power means for maintaining the content of said electrically alterable storage means upon the temporary loss of line power.

64. The device of claim 59 wherein said clock means is also a means for providing signals indicative of the end of each billing period, said clock means being coupled to said microprocessor means, said clock means being operative to cause the recording of the cumulative charge at the end of a billing period.

65. The device of claim 64 further comprised of data storage means for recording the cumulative change at the end of a billing period to provide a stored audit trail.

66. The device of claim 65 further comprised of a printing means for recording the current cumulative charge and the audit trail at the end of a billing period on a separate data storage device.

67. The device of claim 66 wherein said printing means is a means for printing on said separate data storage device in man readable and machine readable form.

68. The device of claim 59 wherein said constants storage means is also a means for storing a base charge.

69. The device of claim 68 wherein said constants storage means is also a means for storing a first cost per unit of the utility, a break point and a second cost per unit of the utility for application above the break point.

70. A device for monitoring usage of a particular utility comprising:
 first means for providing a first signal indicative of the rate of usage of the utility;
 microprocessor means coupled to said first means for providing a second signal responsive to said first signal and indicative of the cumulative charge for the utility, said microprocessor means including constants storage means for storing constans for determining the relationship between said second signal and said first signal, said constants storage means being an electrically alterable storage means;
 reader means coupled to said constants storage means for reading constants information carried by a machine readable data storage device into said constants storage means;
 clock means coupled to said microprocessor for providing signals indicative of the day and time of day, said constants storage means being a means for storing constants representing a first cost per unit of the utility for application during off peak hours and a second cost per unit of the utility for application during peak hours, whereby the relationship of said second signal and the repetition of said first signal may be varied with the time of day; and
 printing means coupled to said microprocessor means and being responsive to said clock means for printing out a previously cumulated charge after the end of a billing period.

71. A device for monitoring usage of a particular utility comprising:
 first means for providing a first signal indicative of the rate of usage of the utility;
 microprocessor means coupled to said first means for providing a second signal responsive to said first signal and indicative of the cumulative charge for the utility, said microprocessor means including constants storage means for storing constants for determining the relationship between said second signal and said first signal, and for storing constants indicative of the allotted utility usage in a particular time period;
 reader means coupled to said constants storage means for reading constants information carried by a machine readable data storage device into said constants storage means; and,
 clock means and control means coupled to said microprocessor means, said clock means being a means for providing signals indicative of the time of day, said control means being a means for shedding predetermined loads based upon time of day and the allotted utility usage.

* * * * *